(12) United States Patent
Sekniqi et al.

(10) Patent No.: US 11,816,094 B2
(45) Date of Patent: Nov. 14, 2023

(54) METASTABLE BYZANTINE AGREEMENT

(71) Applicant: Cornell University, Ithaca, NY (US)

(72) Inventors: Kevin Sekniqi, Ithaca, NY (US); Maofan Yin, Ithaca, NY (US); Robbert van Renesse, Ithaca, NY (US); Emin Gün Sirer, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 17/051,846

(22) PCT Filed: May 9, 2019

(86) PCT No.: PCT/US2019/031506
§ 371 (c)(1),
(2) Date: Oct. 30, 2020

(87) PCT Pub. No.: WO2019/217669
PCT Pub. Date: Nov. 14, 2019

(65) Prior Publication Data
US 2021/0117410 A1  Apr. 22, 2021

Related U.S. Application Data
(60) Provisional application No. 62/669,734, filed on May 10, 2018.

(51) Int. Cl.
G06F 16/23 (2019.01)
G06F 9/52 (2006.01)
(Continued)

(52) U.S. Cl.
CPC .......... G06F 16/2379 (2019.01); G06F 9/526 (2013.01); G06F 16/245 (2019.01);
(Continued)

(58) Field of Classification Search
None
See application file for complete search history.

(56) References Cited

U.S. PATENT DOCUMENTS 8,103,787 B1   1/2012  VanRenesse
9,887,889 B1 * 2/2018  Dippenaar .......... H04L 43/0817
(Continued)

FOREIGN PATENT DOCUMENTS

AU    2016101976 A4   12/2016
CN    107360206 A     11/2017
(Continued)

OTHER PUBLICATIONS

Hanan G. Ayad; Cumulative Voting Consensus Method for Partitions with a Variable Number of Clusters; 2007; iEEE; pp. 160-172 (Year: 2007).*
(Continued)

Primary Examiner — Albert M Phillips, III
Assistant Examiner — Jermaine A Mincey
(74) Attorney, Agent, or Firm — Ryan, Mason & Lewis, LLP

(57) ABSTRACT

An apparatus comprises a first processing node configured to participate in a consensus protocol with a plurality of additional processing nodes. The first processing node is further configured in conjunction with its participation in the consensus protocol to implement repeated polling of respective selected subsets of the additional processing nodes, to resolve a state for a given transaction to a particular one of a plurality of possible states for the given transaction responsive to results of the repeated polling; and to initiate at least one automated action based at least in part on the resolved state for the given transaction. In some embodiments, the first processing node utilizes the results of the repeated polling to maintain a directed acyclic graph or other data
(Continued)

structure of transactions that characterizes relationships between the given transaction and a plurality of other transactions.

31 Claims, 9 Drawing Sheets

(51) Int. Cl.

| | |
|---|---|
| *G06F 16/245* | (2019.01) |
| *G06F 16/27* | (2019.01) |
| *G06Q 20/06* | (2012.01) |
| *G06Q 20/40* | (2012.01) |
| *G06Q 40/04* | (2012.01) |

(52) U.S. Cl.
CPC ......... *G06F 16/27* (2019.01); *G06Q 20/0655* (2013.01); *G06Q 20/401* (2013.01); *G06Q 40/04* (2013.01); *G06Q 2220/00* (2013.01); *G06Q 2230/00* (2013.01)

(56) References Cited

U.S. PATENT DOCUMENTS

| | | | |
|---|---|---|---|
| 10,019,308 | B1 | 7/2018 | Gupta et al. |
| 10,601,836 | B2 * | 3/2020 | Stocker .................... H04L 67/12 |
| 2001/0039630 | A1 | 11/2001 | Kursawe et al. |
| 2002/0129087 | A1 | 9/2002 | Cachin et al. |
| 2007/0214355 | A1 | 9/2007 | Lamport |
| 2008/0071853 | A1 * | 3/2008 | Mosier ................ H04L 67/1095 709/201 |
| 2010/0017644 | A1 | 1/2010 | Butterworth |
| 2011/0047202 | A1 | 2/2011 | Ellison et al. |
| 2018/0219946 | A1 | 8/2018 | Farrahi Moghaddam et al. |

FOREIGN PATENT DOCUMENTS

| | | | | |
|---|---|---|---|---|
| EP | 1212706 | A2 * | 6/2002 | ............. G06F 30/30 |
| EP | 1212706 | B1 | 2/2007 | |
| WO | 2018006945 | A1 | 1/2018 | |
| WO | PCT/US2019/031506 | | 7/2019 | |

OTHER PUBLICATIONS

Du Mingxiao; A review on consensus Algorithm of Blockchain; 2017; IEEE; p. 2567-2572 (Year: 2017).*
R. Kotla et al., "Zyzzyva: Speculative Byzantine Fault Tolerance," ACM Transactions on Computer Systems, vol. 27, No. 4, 2009, 9 pages.
L. Lamport et al., "The Byzantine Generals Problem," ACM Transactions on Programming Languages and Systems, vol. 4, No. 3, Jul. 1982, pp. 382-401.
C. Li et al., "Scaling Nakamoto Consensus to Thousands of Transactions per Second," arXiv:1805.03870v4, Aug. 31, 2018, 17 pages.
P. Mahajan et al., "Depot: Cloud Storage with Minimal Trust," ACM Transactions on Computer Systems, vol. 29, No. 4, Article 12, Dec. 2011, 38 pages.
D. Mazieres, "The Stellar Consensus Protocol: A Federated Model for Internet-Level Consensus," Stellar Development Foundation, Jun. 6, 2016, 85 pages.
A. Miller et al., "The Honey Badger of BFT Protocols," in Proceedings of the 2016 ACMSIGSAC Conference on Computer and Communications Security, Oct. 24-28, 2016, 15 pages.
S. Nakamoto, "Bitcoin: A Peer-to-Peer Electronic Cash System," Bitcoin White Paper, http://bitcoin.org/bitcoin.pdf, 2008, 9 pages.
R. Pass et al., "Analysis of the Blockchain Protocol in Asynchronous Networks," in Advances in Cryptology—EUROCRYPT 2017—36th Annual International Conference on the Theory and Applications of Cryptographic Techniques, May 9, 2016, 38 pages.
R. Pass et al., "FruitChains: A Fair Blockchain," IACR Cryptology ePrint Archive, Oct. 9, 2016, 25 pages.

R. Pass et al., "Thunderella: Blockchains with Optimistic Instant Confirmation," in Advances in Cryptology—EUROCRYPT 2018—37th Annual International Conference on the Theory and Applications of Cryptographic Techniques, Apr. 29-May 3, 2018, 74 pages.
M. Pease et al., "Reaching Agreement in the Presence of Faults," Journal of the Association for Computing Machinery, vol. 27, No. 2, Apr. 1980, pp. 228-234.
R. Rivest et al., "Payword and Micromint: Two Simple Micropayment Schemes," Security Protocols, Apr. 27, 2001, 19 pages.
R. Rodrigues et al., "Large-Scale Byzantine Fault Tolerance: Safe but Not Always Live," . in Proceedings of the 3rdWorkshop on Hot Topics in System Dependability, 2007, 6 pages.
D. Schwartz et al., "The Ripple Protocol Consensus Algorithm," Ripple Labs Inc White Paper, 2014, 8 pages.
A. Singh et al., "Zeno: Eventually Consistent Byzantine-Fault Tolerance," in Proceedings of the 6th USENIX Symposium on Networked Systems Design and Implementation, Apr. 22-24, 2009, 16 pages.
Y. Sompolinsky et al., "Spectre: A Fast and Scalable Cryptocurrency Protocol," IACR Cryptology ePrint Archive, 2016, 71 pages.
Y. Sompolinsky et al., "Secure High-Rate Transaction Processing in Bitcoin," in Financial Cryptography and Data Security, Jan. 26-30, 2015, Revised Selected Papers, 20 pages.
Y. Sompolinsky et al., "Phantom: A Scalable BlockDAG Protocol, "IACR Cryptology ePrint Archive, 2018, 26 pages.
V. Vishnumurthy et al., "Karma: A Secure Economic Framework for Peer-to-Peer Resource Sharing," in Workshop on Economics of Peer-to-peer Systems, vol. 35, 2003, 6 pages.
Wondernetwork, "Global Ping Statistics: Ping Times between WonderNetwork Servers," https://wondernetwork.com/pings, Accessed Oct. 27, 2020, 2 pages.
J. Lim et al., "Gossip Membership Management with Social Graphs for Byzantine Fault Tolerance in Clouds," 11th IFIP International Conferences on Network and Parallel Computing, Sep. 2014, 12 pages.
E. Bortnikov et al., "Brahms: Byzantine Resilient Random Membership Sampling," Computer Networks, vol. 53, No. 13, Aug. 28, 2009, 25 pages.
J. Lim et al., "Scalable and Leaderless Byzantine Consensus in Cloud Computing Environments," Information Systems Frontiers, vol. 16, 2014, pp. 19-34.
J. Lim et al., "Byzantine-Resilient Dual Gossip Membership Management in Clouds," Soft Computing, vol. 22, pp. 3011-3022.
J. F. Mikalsen, "FireChain: An Efficient Blockchain Protocol using Secure Gossip," The Arctic University of Norway, Master Thesis in Computer Science, Jun. 1, 2018, 92 pages.
P. Chevalier et al., "Protocol for Asynchronous, Reliable, Secure and Efficient Consensus (PARSEC)," https://docs.maidsafe.net/Whitepapers/pdf/PARSEC.pdf, Jun. 20, 2018, 17 pages.
P. Li et al., "Gosig: Scalable Byzantine Consensus on Adversarial Wide Area Network for Blockchains," arXiv:1802.01315v1, Feb. 5, 2018, 14 pages.
R. Van Renesse, "A Blockchain Based on Gossip? A Position Paper," Distributed Cryptocurrencies and Consensus Ledgers, Jul. 25, 2016, 4 pages.
Coinmarketcap, "Cryptocurrency Prices, Charts, and Market Capitalizations," https://coinmarketcap.com, Accessed Oct. 27, 2020, 11 pages.
M. Abd-El-Malek et al., "Fault Scalable Byzantine Fault Tolerant Services," in ACM SIGOPS Operating Systems Review, vol. 39, Oct. 23-26, 2005, 16 pages.
I. Abraham et al., "Efficient Synchronous Byzantine Consensus," arXiv:1704.02397v2, Sep. 12, 2017, 19 pages.
J. Aspnes et al., "Exposing Computationally-Challenged Byzantine Impostors," Yale University Department of Computer Science Technical Report, YALEU/DCS/TR-1332, Jul. 26, 2005, 9 pages.
L. Baird, "The Swirlds Hashgraph Consensus Algorithm: Fair, Fast, Byzantine Fault Tolerance," Swirlds Technical Report, Swirlds-TR-2016-01, May 31, 2016, 28 pages.
I. Bentov et al., "Tortoise and Hares Consensus: The Meshcash Framework for Incentive-Compatible, Scalable Cryptocurrencies," https://eprint.iacr.org/2017/300.pdf, IACR Cryptology, 2017, 47 pages.

(56) References Cited

OTHER PUBLICATIONS

Bitnodes, "Global Bitcoin Nodes Distribution," https://bitnodes.earn.com, Accessed Oct. 27, 2020, 3 pages.

E. Buchman, "Tendermint: Byzantine Fault Tolerance in the Age of Blockchains," University of Guelph Thesis, Jun. 2016, 109 pages.

E. Buchman et al., "The Latest Gossip on BFT Consensus," arXiv:1807.04938v3, Nov. 22, 2019, 14 pages.

M. Burrows, "The Chubby Lock Service for Loosely-Coupled Distributed Systems," in 7th Symposium on Operating Systems Design and Implementation (OSDI'06), Nov. 6-8, 2006, pp. 335-350.

M. Castro et al. "Practical Byzantine Fault Tolerance," Proceedings of the Third Symposium on Operating Systems Design and Implementation, Feb. 22-25, 1999, 14 pages.

Central Intelligence Agency, "The World Factbook," https://www.cia.gov/library/publications/the-world-factbook/geos/da.html, Accessed Oct. 27, 2020, 22 pages.

J. Cowling et al., "HQ Replication: A Hybrid Quorum Protocol for Byzantine Fault Tolerance," in Proceedings of the 7th symposium on Operating Systems Design and Implementation, USENIX Association, 2006, pp. 177-190.

K. Croman et al., "On Scaling Decentralized Blockchains—A Position Paper," in Financial Cryptography and Data Security—FC 2016 International Workshops, Bitcoin, Voting, and WAHC, Feb. 26, 2016, 16 pages.

P. Daian et al., "Snow White: Robustly Reconfigurable Consensus and Applications to Provably Secure Proof of Stake," https://eprint.iacr.org/2016/919, Cryptology ePrint Archive, Sep. 21, 2016, 65 pages.

B. David et al., "Ouroboros Praos: An Adaptively-Secure, Semisynchronous Proof-of-Stake Blockchain," in Advances in Cryptology—EUROCRYPT 2018—37th Annual International Conference on the Theory and Applications of Cryptographic Techniques, Apr. 29-May 3, 2018, 37 pages.

A. Demers et al., "Epidemic Algorithms for Replicated Database Maintenance," Xerox PARC, CSL-89-1, Jan. 1989, 27 pages.

Digiconomist, "Bitcoin Energy Consumption Index," https://digiconomist.net/bitcoin-energy-consumption, Accessed Oct. 27, 2020, 13 pages.

J. R. Douceur, "The Sybil Attack," in International Workshop on Peer-to-Peer Systems, 2002, 6 pages.

C. Dwork et al., "Pricing via Processing or Combatting Junk Mail," in Advances in Cryptology—CRYPTO '92, 12th Annual International Cryptology Conference, Aug. 16-20, 1992, pp. 139-147.

I. Eyal et al., "Bitcoin-NG: A Scalable Blockchain Protocol," arXiv:1510.02037v2, Nov. 11, 2015, 21 pages.

J. Garay et al., "The Bitcoin Backbone Protocol: Analysis and Applications," in Advances in Cryptology—EUROCRYPT 2015—34th Annual International Conference on the Theory and Applications of Cryptographic Techniques, Jun. 11, 2017, 44 pages.

Y. Gilad et al., "Algorand: Scaling Byzantine Agreements for Cryptocurrencies," in Proceedings of the 26th Symposium on Operating Systems Principles, Oct. 28-31, 2017, pp. 51-68.

R. Guerraoui et al., "Highly Dynamic Distributed Computing with Byzantine Failures," in Proceedings of the 2013 ACM Symposium on Principles of Distributed, Jul. 22-24, 2013, pp. 176-183.

W. Hoeffding, "Probability Inequalities for Sums of Bounded Random Variables," University of North Carolina Department of Statistics, May 1962, 25 pages.

P. Hunt et al., "Zookeeper: Wait-Free Coordination for Internet-Scale Systems," . in 2010 USENIX Annual Technical Conference, Jun. 23-25, 2010, 14 pages.

H. D. Johansen et al., "Fireflies: A Secure and Scalable Membership and Gossip Service," ACM Transactions on Computer Systems, vol. 33, No. 2, Article 5, May 2015, 32 pages.

R. Kapitza et al., "Cheapbft: Resource-Efficient Byzantine Fault Tolerance," in Proceedings of the 7th ACM European Conference on Computer Systems, Apr. 10-13, 2012, 14 pages.

A. Kiayias et al., "Ouroboros: A Provably Secure Proof-of-Stake Blockchain Protocol," in Advances in Cryptology—CRYPTO 2017—37th Annual International Cryptology Conference, Aug. 20-24, 2017, pp. 357-388.

E. Kokoris-Kogias et al., "Enhancing Bitcoin Security and Performance with Strong Consistency via Collective Signing," arXiv:1602.06997v3, Aug. 1, 2016, 18 pages.

J. Aspnes, "Randomized Protocols for Asynchronous Consensus," arXiv:cs/0209014v1, Sep. 6, 2002, 29 pages.

M. Ben-Or, "Another Advantage of Free Choice: Completely Asynchronous Agreement Protocols, " in Proceedings of the Second Annual ACM Symposium on Principles of Distributed Computing, 1983, pp. 27-30.

C. Cachin et al., "Blockchain Consensus Protocols in the Wild," 2017 International Symposium on Distributed Computing, 2017, 16 pages.

A. Clement et al., "Making Byzantine Fault Tolerant Systems Tolerate Byzantine Faults," . in Proceedings of the 6th USENIX Symposium on Networked Systems Design and Implementation, Apr. 22-24, 2009, 14 pages.

R. Guerraoui et al., "The Next 700 BFT Protocols," in Proceedings of the 5th European Conference on Computer Systems, Apr. 13-16, 2010, 14 pages.

* cited by examiner

1: procedure ONQUERY($v$, col′)
2:    if col = ⊥ then col := col′
3:    RESPOND($v$, col)
4: procedure SLUSHLOOP($u$, col$_0$ ∈ {R, B, ⊥})
5:    col := col$_0$ // initialize with a color
6:    for $r \in \{1 \ldots m\}$ do
7:       // if ⊥, skip until ONQUERY sets the color
8:       if col = ⊥ then continue
9:       // randomly sample from the known nodes
10:       $\mathcal{K}$ := SAMPLE($\mathcal{N} \setminus u, k$)
11:       $P$ := [QUERY($v$, col) for $v \in \mathcal{K}$]
12:       for col′ ∈ {R, B} do
13:          if $P$.COUNT(col′) ≥ $\alpha \cdot k$ then
14:             col := col′
15:    ACCEPT(col)

FIG. 2

```
1: procedure SNOWFLAKELOOP(u, col₀ ∈ {R, B, ⊥})
2:     col := col₀, cnt := 0
3:     while undecided do
4:         if col = ⊥ then continue
5:         K := SAMPLE(N\u, k)
6:         P := [QUERY(v, col)  for v ∈ K]
7:         for col' ∈ {R, B} do
8:             if P.COUNT(col') ≥ α · k then
9:                 if col' ≠ col then
10:                    col := col', cnt := 0
11:                else
12:                    if ++cnt > β then ACCEPT(col)
```

FIG. 3

1: procedure SNOWBALLLOOP($u$, $col_0 \in \{R, B, \bot\}$)
2:     $col := col_0$, $lastcol := col_0$, $cnt := 0$
3:     $d[R] := 0$, $d[B] := 0$
4:     while undecided do
5:         if $col = \bot$ then continue
6:         $\mathcal{K} := \text{SAMPLE}(\mathcal{N} \setminus u, k)$
7:         $P := [\text{QUERY}(v, col) \text{ for } v \in \mathcal{K}]$
8:         for $col' \in \{R, B\}$ do
9:             if $P.\text{COUNT}(col') \geq \alpha \cdot k$ then
10:                 $d[col']\text{++}$
11:                 if $d[col'] > d[col]$ then
12:                       $col := col'$
13:                 if $col' \neq lastcol$ then
14:                       $lastcol := col'$, $cnt := 0$
15:                 else
16:                       if $\text{++}cnt > \beta$ then ACCEPT($col$)

FIG. 4

1: procedure AVALANCHELOOP
2:    while true do
3:       find $T$ that satisfies $T \in \mathcal{T} \wedge T \notin \mathcal{Q}$
4:       $\mathcal{K} := \text{SAMPLE}(\mathcal{N} \backslash u, k)$
5:       $P := \sum_{v \in \mathcal{K}} \text{QUERY}(v, T)$
6:       if $P \geq \alpha \cdot k$ then
7:          $c_T := 1$
8:          // update the preference for ancestors
9:          for $T' \in \mathcal{T} : T' \stackrel{*}{\leftarrow} T$ do
10:            if $d(T') > d(\mathcal{P}_{T'}.\text{pref})$ then
11:               $\mathcal{P}_{T'}.\text{pref} := T'$
12:            if $T' \neq \mathcal{P}_{T'}.\text{last}$ then
13:               $\mathcal{P}_{T'}.\text{last} := T', \mathcal{P}_{T'}.\text{cnt} := 0$
14:            else
15:               $++\mathcal{P}_{T'}.\text{cnt}$
16:       // otherwise, $c_T$ remains 0 forever
17:       $\mathcal{Q} := \mathcal{Q} \cup \{T\}$   // mark T as queried

FIG. 5

1: procedure INIT
2: $\quad \mathcal{T} := \varnothing$ // the set of known transactions
3: $\quad \mathcal{Q} := \varnothing$ // the set of queried transactions
4: procedure ONGENERATETX(data)
5: $\quad$ edges $:= \{T' \leftarrow T : T' \in \text{PARENTSELECTION}(\mathcal{T})\}$
6: $\quad T := \text{Tx}(\text{data}, \text{edges})$
7: $\quad$ ONRECEIVETX($T$)
8: procedure ONRECEIVETX($T$)
9: $\quad$ if $T \notin \mathcal{T}$ then
10: $\quad\quad$ if $\mathcal{P}_T = \varnothing$ then
11: $\quad\quad\quad$ $\mathcal{P}_T := \{T\}, \mathcal{P}_T.\text{pref} := T$
12: $\quad\quad\quad$ $\mathcal{P}_T.\text{last} := T, \mathcal{P}_T.\text{cnt} := 0$
13: $\quad\quad$ else $\mathcal{P}_T := \mathcal{P}_T \cup \{T\}$
14: $\quad\quad$ $\mathcal{T} := \mathcal{T} \cup \{T\}, c_T := 0.$

FIG. 6

1: function ISPREFERRED($T$)
2:     return $T = \mathcal{P}_T.\text{pref}$
3: function ISSTRONGLYPREFERRED($T$)
4:     return $\forall T' \in \mathcal{T}, T' \stackrel{*}{\leftarrow} T : \text{ISPREFERRED}(T')$
5: function ISACCEPTED($T$)
6:     return
    $((\forall T' \in \mathcal{T}, T' \leftarrow T : \text{ISACCEPTED}(T'))$
      $\wedge |\mathcal{P}_T| = 1 \wedge d(T) > \beta_1)$   // safe early commitment
    $\vee (\mathcal{P}_T.\text{cnt} > \beta_2)$   // consecutive counter 7: procedure ONQUERY($j, T$)
8:     ONRECEIVETX($T$)
9:     RESPOND($j, \text{ISSTRONGLYPREFERRED}(T)$)

FIG. 7

METASTABLE BYZANTINE AGREEMENT

PRIORITY CLAIM

The present application claims priority to U.S. Provisional Patent Application Ser. No. 62/669,734, filed May 10, 2018 and entitled "Metastable Byzantine Agreement," which is incorporated by reference herein in its entirety.

FIELD

The field relates generally to information security, and more particularly to consensus protocols for use in cryptocurrencies and other applications.

BACKGROUND

A number of Byzantine Fault Tolerant (BFT) protocols are known in the art. These protocols in some cases may be viewed as belonging to a sub-field of computer science referred to as "distributed computing." For example, BFT protocols may be used to allow a set of machines (e.g., servers) that are mutually distrusting to reach agreement. Such agreement is also referred to as "consensus." Usually, BFT protocols in this context are able to operate properly as long as no more than a maximum threshold number of the servers are corrupt (e.g., may behave arbitrarily and may attempt to prevent the network from reaching consensus). Conventional BFT protocols include the Nakamoto consensus protocols utilized in cryptocurrencies such as Bitcoin and Ethereum.

SUMMARY

Illustrative embodiments provide improved consensus protocols for use in cryptocurrencies and other applications. In some embodiments, the consensus protocols more particularly comprise leaderless BFT protocols illustratively built on a metastable network probing mechanism.

For example, some embodiments use a metastable network polling mechanism to achieve consensus. The above-noted Nakamoto consensus protocols use proof-of-work to achieve consensus, making them highly inefficient. In contrast, metastable consensus protocols in illustrative embodiments described herein are quiescent when no decisions are being made and require no proof-of-work, although some embodiments can be used in conjunction with proof-of-work.

Classical consensus protocols that do not use proof-of-work typically rely on an all-to-all broadcast mechanism, usually facilitated by a leader. These protocols typically but not necessarily incur quadratic message complexity cost. In addition, the presence of a leader typically imposes a performance bottleneck. Some conventional protocols of this type require many rounds of communication until a consensus is reached, with all-to-all communication being required in each round. For these and other reasons, conventional approaches generally do not scale to large numbers of servers.

In contrast, metastable consensus protocols in illustrative embodiments described herein may be configured to sample the network repeatedly.

As a result, metastable consensus protocols in these illustrative embodiments scale well with network size and are highly efficient in message complexity, providing higher throughput and lower latency than conventional systems.

Furthermore, some embodiments implement techniques which amortize cost by constructing a directed acyclic graph (DAG) or other data structure that allows a single network polling to implicitly vote for several transactions at once, although it is to be appreciated that use of a DAG or other type of data structure to amortize cost is not required. Examples of other types of data structures that may be used in illustrative embodiments include a linked list of transactions and a hash-linked chain of transactions. In some embodiments, a DAG is implemented in the form of a linearly ordered, chained data structure configured not only to resolve transaction conflicts, but also to provide a platform in which a consistent totally-ordered log is replicated across the network.

Although suitable for deploying cryptocurrencies efficiently and at large scale, the disclosed techniques can be applied in a wide variety of other types of applications, including applications outside of the cryptocurrency context. For example, the metastable consensus protocols disclosed herein can be used to implement wide-area consensus in computer networks for certain settings.

In one embodiment, an apparatus comprises a first processing node configured to participate in a consensus protocol with a plurality of additional processing nodes. The first processing node is further configured in conjunction with its participation in the consensus protocol to implement repeated polling of respective selected subsets of the additional processing nodes, to resolve a state for a given transaction to a particular one of a plurality of possible states for the given transaction responsive to results of the repeated polling, and to initiate at least one automated action based at least in part on the resolved state for the given transaction.

Resolving the state for the given transaction in some embodiments comprises utilizing the results of the repeated polling to make a determination as to whether or not the given transaction should be accepted as a valid transaction. Such accepting of a given transaction as a valid transaction is considered an example of what is more generally referred to herein as "resolving the state" for the given transaction. A wide variety of other types of transactions each having multiple possible states subject to consensus-based resolution to a particular state can be processed in other embodiments.

In some embodiments, the repeated polling is repeated for a plurality of iterations, where a given one of the iterations comprises selecting a sample of the additional processing nodes, and sending queries to respective ones of the selected additional processing nodes. The sample in some embodiments comprises a probabilistic sample, illustratively selected at random. As another example, the sample can be selected deterministically, possibly using a seed.

Responsive to receipt of at least a threshold number of responses to the queries, the first processing node determines if at least a designated portion of the received responses indicate a particular state for the given transaction that differs from a current state for the given transaction in the first processing node. Alternatively, such a determination can be made responsive to a particular timeout being reached, if sufficient responses are not received prior to the particular timeout being reached.

Responsive to the designated portion of the received responses indicating a particular state for the given transaction that differs from a current state for the given transaction in the first processing node, the first processing node updates its current state for the given transaction to the particular state.

Additionally or alternatively, the first processing node in some embodiments is configured to maintain a DAG of transactions that characterizes relationships between the given transaction and a plurality of other transactions, with the transactions being partitioned into mutually exclusive conflict sets. In a given such embodiment, maintaining the DAG illustratively comprises selecting a sample of the additional processing nodes, sending queries to respective ones of the selected additional processing nodes, and updating the DAG based at least in part on responses to the queries. The updating of the DAG in this embodiment illustratively comprises inserting one or more additional transactions into the DAG, updating confidence values for respective ones of the transactions of the DAG, and/or repartitioning the transactions of the DAG into mutually exclusive conflict sets. Again, other types of data structures, such as linked lists and hash-linked chains, can be used in other embodiments.

These and other illustrative embodiments of the invention include but are not limited to systems, methods, apparatus, processing devices, integrated circuits, and computer program products comprising processor-readable storage media having software program code embodied therein.

BRIEF DESCRIPTION OF THE FIGURES

FIGS. 2 through 7 show example sets of pseudocode for different variants of consensus protocols in illustrative embodiments.

DETAILED DESCRIPTION

Embodiments of the invention can be implemented, for example, in the form of information processing systems comprising computer networks or other arrangements of networks, clients, servers, processing devices and other components. Illustrative embodiments of such systems will be described in detail herein. It should be understood, however, that embodiments of the invention are more generally applicable to a wide variety of other types of information processing systems and associated networks, clients, servers, processing devices or other components. Accordingly, the term "information processing system" as used herein is intended to be broadly construed so as to encompass these and other arrangements. The term "processing device" as used herein is similarly intended to broadly construed, so as to further encompass, for example, robots and other automata.

Figure 1:
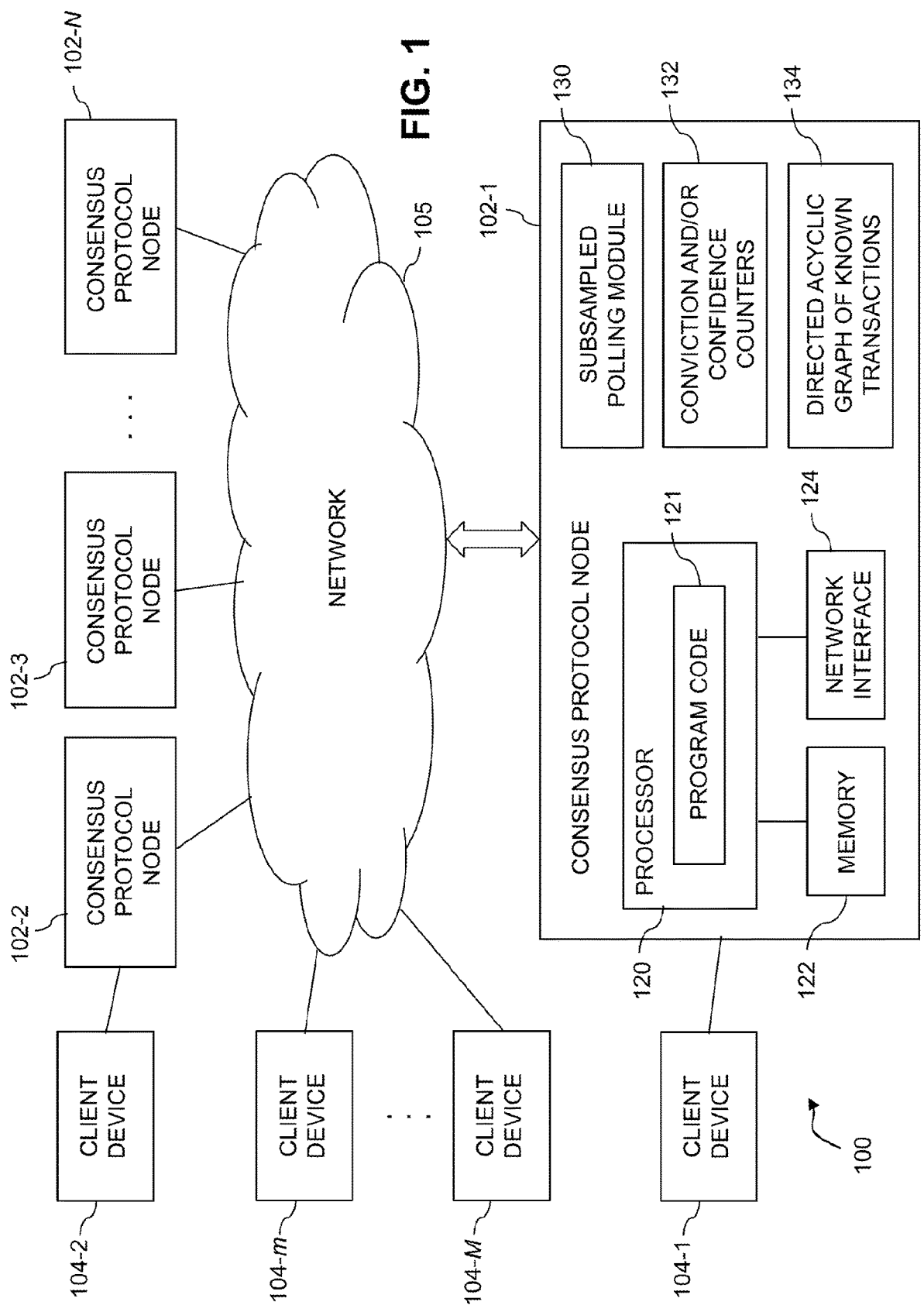
FIG. 1 shows an information processing system configured with functionality for implementing a consensus protocol for metastable Byzantine agreement in an illustrative embodiment.

FIG. 1 shows an information processing system 100 implementing a consensus protocol for metastable Byzantine agreement in an illustrative embodiment. The system 100 comprises a plurality of consensus protocol nodes 102-1, 102-2, 102-3, . . . 102-N. The consensus protocol nodes 102 are configured to communicate with one another over a network 105. The system 100 further comprises a plurality of client devices 104, including client devices 104-1 and 104-2 which are coupled to the network 105 via respective consensus protocol nodes 102-1 and 102-2, and additional client devices 104-$m$ through 104-M that are coupled directly to the network 105. Numerous other arrangements are possible.

For example, in some embodiments, each of the client devices 104 is coupled to the network 105 via a corresponding one of the consensus protocol nodes 102. As another example, one or more of the client devices 104 may have a corresponding one of the consensus protocol nodes 102 incorporated therein.

The client devices 104-$m$ through 104-M coupled directly to the network can each be configured, for example, to incorporate a consensus protocol node as an internal component thereof, in combination with other types of internal components configured to perform various other functions. In some embodiments, the client devices 104-$m$ through 104-M coupled directly to the network are eliminated altogether.

It should be noted that certain ones of the variables m, M and N used with reference to nodes 102 and client devices 104 in the embodiment of FIG. 1 are utilized in different ways in other contexts elsewhere herein. The different meanings will be clear from the respective distinct contexts.

The consensus protocol nodes 102 are examples of what are more generally referred to herein as "processing nodes" each comprising a processor coupled to a memory. Such processing nodes in some embodiments are implemented as respective processing devices, or as portions of respective processing devices. Examples of processing nodes as that term is broadly used herein comprise computers, servers and other types of machines. As a more particular example, in some embodiments, at least a subset of the consensus protocol nodes 102 are implemented as respective servers.

Each of the consensus protocol nodes 102 is configured to participate in a consensus protocol with other ones of the consensus protocol nodes 102, as will be described in more detail below. A given processing device can implement a consensus protocol node as well other related functionality.

One or more of the client devices 104 can each comprise, for example, a laptop computer, tablet computer or desktop personal computer, a mobile telephone, or another type of computer or communication device, embedded device, or robot, as well as combinations of multiple such devices. As noted above, in some embodiments, at least one of the client devices can implement a corresponding one of the consensus protocol nodes 102. The client devices 104 illustratively generate transactions that are processed by the consensus protocol nodes 102. The client devices 104 are more generally referred to herein as respective "clients."

Communications between the various elements of system 100 are assumed to take place over one or more networks collectively represented by network 105 in the figure. The network 105 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The consensus protocol node 102-1 as illustrated in the figure comprises a processor 120, a memory 122 and a network interface 124. The processor 120 is operatively coupled to the memory 122 and to the network interface 124. The processor 120 is configured to execute software program code 121 for implementing functionality associated with a consensus protocol for metastable Byzantine agreement.

The processor 120 may comprise, for example, a microprocessor, an application-specific integrated circuit (ASIC), a field-programmable gate array (FPGA), a central processing unit (CPU), an arithmetic logic unit (ALU), a graphics processing unit (GPU), a digital signal processor (DSP), or other similar processing device component, as well as other types and arrangements of processing circuitry, in any combination. At least portions of the software program code 121 executed by the processor 120 are also stored in the memory 122 and retrieved therefrom by the processor 120 for execution.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with a consensus protocol for metastable Byzantine agreement as disclosed herein.

The network interface 124 is configured to allow the consensus protocol node 102-1 to communicate over the network 105 with other system elements, and illustratively comprises one or more conventional transceivers.

The consensus protocol node 102-1 further comprises a subsampled polling module 130, conviction and/or confidence counters 132, and a directed acyclic graph (DAG) of known transactions 134. At least portions of one or more of subsampled polling module 130, counters 132 and DAG 134 of the consensus protocol node 102-1 can be implemented at least in part utilizing software stored in memory 122 and executed by processor 120. For example, a consensus protocol for metastable Byzantine agreement as disclosed herein illustratively involves sampling other ones of the consensus protocol nodes 102 using subsampled polling module 130, as well as maintaining the counters 132 and DAG 134.

As indicated previously, the term "directed acyclic graph" or DAG as used herein is intended to broadly construed. Moreover, various non-DAG data structures can be used in other embodiments, or the use of a DAG or other data structure can be eliminated altogether, for example, in embodiments involving singleton decisions. It is therefore to be appreciated that the DAG 134 can be replaced with other types of data structures or eliminated completely in other embodiments.

Each of the other consensus protocol nodes 102 of the system 100 is assumed to be configured in a manner similar to that described above for consensus protocol node 102-1. Other processing node configurations can be used in other embodiments.

In operation, each of the consensus protocol nodes 102 interacts with selected subsets of the other ones of the consensus protocol nodes 102 in carrying out a consensus protocol of the type disclosed herein. For example, the consensus protocol node 102-1 via its subsampled polling module 130 implements repeated polling of respective selected subsets of the other consensus protocol nodes 102, resolves a state for a given transaction to a particular one of a plurality of possible states for the given transaction responsive to results of the repeated polling, and initiates at least one automated action based at least in part on the resolved state for the given transaction. The repeated polling may be over subsets of nodes chosen probabilistically (i.e., at random) or deterministically.

In some embodiments, the given transaction comprises a cryptocurrency transaction, although a wide variety of other types of transactions can be supported. The term "transaction" as used herein is therefore intended to be broadly construed. For example, resolving a state for a given transaction as that term is broadly used herein can comprise determining a particular one of a plurality of possible values for a variable, determining whether or not a command or script should be executed, and so on. The given transaction can therefore comprise any type of information element having multiple possible states suitable for consensus-based resolution to a particular one of the possible states by the consensus protocol nodes 102 of the system 100.

In illustrative embodiments to be described below in conjunction with FIGS. 2 through 4, resolving a given transaction comprises, for example, determining a particular value, such as either {red or blue} or {accepted or rejected}, for a variable, through performance of a consensus protocol. Other embodiments to be described below in conjunction with FIGS. 5 through 9 more generally refer to transactions.

It is to be appreciated in this regard that some embodiments can be configured to support multiple value consensus and/or multiple transaction consensus, as well as other arrangements involving different numbers of candidates. Accordingly, illustrative embodiments can resolve state among one, two, or more than two candidates, and should not be viewed as limited to any particular bivalent examples disclosed herein.

The consensus protocol nodes 102 are illustratively configured to collectively "yield" in a majority direction, or in other words "topple over" to a certain consensus regarding a particular state for the given transaction, such as the red or blue state for the variable in FIGS. 2 through 4. The interactions of the consensus protocol nodes 102 therefore cause the state for the given transaction to be resolved to a particular one of the multiple possible states once consensus is reached. The state for the given transaction prior to its resolution is also referred to herein as a "metastable" state. The consensus protocol in an embodiment of this type is referred to herein as a metastable consensus protocol.

Each of the consensus protocol nodes 102 in such an embodiment illustratively selects, establishes or otherwise determines an initial state for the given transaction, repeatedly samples different subsets of the other consensus protocol nodes 102 in order to determine the particular state currently favored by those sampled subsets of nodes, and yields to the majority state preference if a threshold is met. This repeated sampling is illustratively performed substantially simultaneously by all of the consensus protocol nodes 102, with each of those nodes executing subsampled polling relative to other ones of the nodes. The consensus protocol nodes 102 with high likelihood will eventually reach a consensus regarding a particular state for the given transaction. As noted above, until consensus regarding the state is reached by the consensus protocol nodes 102, the state remains unresolved. However, it can evolve over time, for example, from "unknown" to "likely" to "accepted" or otherwise resolved.

The metastable consensus protocols in illustrative embodiments are configured to provide Byzantine fault tolerance, as will be described in more detail elsewhere herein.

Automated actions that are initiated based at least in part on the resolved state for the given transaction can include various actions associated with maintenance of a distributed ledger, although numerous other automated actions can be performed, such as initiating execution of a command or script.

For example, in some embodiments, an automated action initiated by the consensus protocol node 102-1 based at least in part on the resolved state for the given transaction comprises adding an entry characterizing the given transaction to a distributed ledger collectively maintained by the first consensus protocol node 102-1 and other ones of the consensus protocol nodes 102.

In some embodiments involving cryptocurrency, the entry in an arrangement of this type illustratively comprises a block and the distributed ledger comprises a blockchain. A given such blockchain is typically modeled as a number of linearly chained blocks, but illustrative embodiments herein more generally refer to blockchain as potentially encompassing any arrangement of structured blocks that carry information for transactions and/or contracts. Embodiments involving blockchain herein should therefore not be viewed as being limited to linearly chained blocks.

The blockchain in some embodiments comprises a cryptocurrency blockchain collectively maintained by the consensus protocol nodes 102. In such embodiments, the given transaction can comprise, for example, a blockchain transaction utilized to associate a designated amount of cryptocurrency with a cryptocurrency address.

As indicated above, the term "blockchain" as used herein is intended to be broadly construed, so as to encompass distributed ledgers and other similar arrangements that are collectively maintained by multiple processing devices performing cryptographic operations involving interrelated data blocks.

Blockchains as used in embodiments herein can therefore include, for example, "permissionless" or public blockchains in which any user can participate in building consensus for validation of blockchain transactions, as well as "permissioned" or private blockchains in which only restricted sets of users can participate in building consensus for validation of blockchain transactions. In some embodiments, the set of entrants can be restricted using a Sybil control mechanism that illustratively requires the entrants to present a resource in order to restrict the number of identities that a single user can represent, including proof-of-work, proof-of-stake, proof-of-authority, proof-of-space, proof-of-time, proof-of-elapsed-time, and others, as well as combinations thereof.

A given blockchain in some embodiments can comprise one or more smart contract programs. Such a smart contract program of a blockchain may itself comprise multiple separate programs.

Other embodiments can be configured to utilize consensus protocols for metastable Byzantine agreement of the type disclosed herein to process payments or other transactions not involving blockchain.

In some embodiments, participation of particular ones of the consensus protocol nodes 102 in the consensus protocol is controlled in accordance with at least one specified control mechanism requiring submission of one or more designated proofs by each of the consensus protocol nodes 102. The designated proof in some embodiments illustratively comprises a proof other than a proof-of-work, such as the above-noted proof-of-stake or proof-of-authority. However, it is to be appreciated that some embodiments can be configured to utilize proof-of-work as a control mechanism. A given such proof in illustrative embodiments herein is utilized to address the problem of Sybil attacks rather than utilized for achieving consensus as in certain conventional protocols.

The repeated polling performed by the subsampled polling module 130 is illustratively repeated for a number of iterations. In some embodiments, the number of iterations is approximately logarithmic in the number of consensus protocol nodes 102, although such an arrangement is not required. Other types of repeated polling can be used in other embodiments. Terms such as "subsampled polling" as used herein are intended to be broadly construed so as to encompass, for example, arrangements in which the consensus protocol node 102-1 randomly or otherwise selects different subsets of the other consensus protocol nodes 102 to poll in each of a plurality of polling intervals.

Such polling is considered "subsampled" in that the number of the other consensus protocol nodes 102 that are polled by the consensus protocol node 102-1 in each of the polling intervals is lower than N−1, the total number of other consensus protocol nodes 102 in the system. For example, a given sample of the consensus protocol nodes 102 selected for polling in a particular polling interval illustratively comprises a probabilistic sample, illustratively selected at random using a pseudorandom number generator (PRNG) or other similar arrangement. Embodiments of this type are referred to herein as performing probabilistic polling. As another example, the sample can be selected deterministically, possibly using a seed. Any deterministic function may be used in such a deterministic sampling arrangement. Illustrative embodiments are therefore not limited in terms of the particular type of sampling used to select subsets of the consensus protocols for polling.

It should also be noted in this regard that the number of nodes that are polled in illustrative embodiments disclosed herein is typically much smaller than the number of nodes involved in conventional BFT protocols. For example, conventional BFT protocols would usually require involvement of at least about ⅔ of the N nodes, or possibly even more than ⅔ of the N nodes, whereas illustrative embodiments disclosed herein can be configured to utilize subsampled polling of a very small fraction of the N nodes, thereby providing significant advantages relative to the conventional BFT protocols.

The consensus protocol nodes 102 are also collectively referred to as a "network" and the subsampled polling is referred to as "sampling the network." An information processing system such as system 100 that includes such a network of consensus protocol nodes is also referred to herein as simply a "system."

The consensus protocol node 102-1 in some embodiments is configured to utilize the results of the repeated polling to maintain the DAG 134 of known transactions. The DAG 134 illustratively characterizes relationships between the given transaction and a plurality of other transactions. The DAG 134 is an example of what is more generally referred to herein as a "data structure" characterizing known transactions. Other types of data structures that may be used in place of the DAG 134 in other embodiments include, for example, a linked list of transactions and a hash-linked chain of transactions. Such data structures can take on a variety of different of types of formats, including tree-based formats, and illustrative embodiments are not limited in this regard.

In some embodiments, the DAG 134 itself is implemented in the form of a linearly ordered, chained data structure configured not only to resolve transaction conflicts, but also to provide a platform in which a consistent totally-ordered log is replicated across the network. Each entry of the log in such an embodiment may serve as a container for designated general-purpose user data. For example, state transitions of an application could be encoded as commands in each container. Thus, correct nodes will have a consistently replicated application state so as to provide service with fault tolerance.

The term "directed acyclic graph" as used herein is intended to be broadly construed so as to encompass such data structures. It is also to be appreciated that other embodiments need not maintain or otherwise utilize a DAG or other data structure of known transactions in resolving the state of a given transaction.

In some embodiments, resolving the state for a given transaction responsive to results of the repeated polling comprises utilizing the results of the repeated polling to make a determination as to whether or not the given transaction should be accepted as a valid transaction. It should be noted in this regard an invalid transaction can never be accepted, but not all valid transactions will be accepted. A valid transaction can therefore have as its possible states, for example, at least the two states {accepted or rejected}. More generally, there are three possible states in this example, namely, accepted, rejected and undecided, where undecided denotes that neither one of the first two states has yet been reached.

As indicated previously, resolving the state for the given transaction responsive to results of the repeated polling can involve determining a particular one of a plurality of possible values for a variable, determining whether or not a command or script should be executed, and so on. These and a wide variety of other types of transactions subject to consensus-based resolution can be used in other embodiments. Accordingly, accepting a given transaction as a valid transaction is considered an example of what is more generally referred to herein as "resolving the state" for the given transaction. A wide variety of other arrangements can be used in conjunction with resolving the state of a given transaction at that term is broadly used herein. Illustrative embodiments that refer to accepting transactions should therefore not be viewed as limiting in any way the particular manner in which the state of a transaction is resolved.

As noted above, the repeated polling is illustratively repeated for a plurality of iterations. A given one of the iterations performed by the consensus protocol node 102-1 in some embodiments more particularly comprises selecting a sample of the other consensus protocol nodes 102, and sending queries to respective ones of the selected consensus protocol nodes 102.

Responsive to receipt of at least a threshold number of responses to the queries, the consensus protocol node 102-1 determines if at least a designated portion of the received responses indicate a particular state for the given transaction that differs from a current state for the given transaction in the consensus protocol node 102-1. Alternatively, such a determination can be made responsive to a particular timeout being reached, if the threshold number of responses are not received prior to the particular timeout being reached.

Responsive to the designated portion of the received responses indicating a particular state for the given transaction that differs from a current state for the given transaction in the consensus protocol node 102-1, the consensus protocol node 102-1 updates the current state for the given transaction in the first processing node to the particular state.

In such an embodiment, resolving the state for the given transaction responsive to results of the repeated polling illustratively comprises resolving the state for the given transaction to the current state at the completion of the plurality of iterations.

The consensus protocol node 102-1 in some embodiments utilizes one or more of the counters 132 in resolving the state for the given transaction. The counters 132 illustratively comprise at least one conviction counter and/or at least one confidence counter.

For example, in some embodiments, the consensus protocol node 102-1 maintains a conviction strength counter that indicates a number of consecutive iterations of the repeated polling for which at least a designated portion of the received responses indicate the particular state for the given transaction. Resolving the state for the given transaction responsive to results of the repeated polling in such an embodiment illustratively comprises resolving the state for the given transaction to the particular state responsive to the conviction strength counter exceeding a threshold.

Additionally or alternatively, the consensus protocol node 102-1 maintains confidence counters for respective ones of the possible states for the given transaction, with each of the confidence counters indicating a total number of queries over multiple ones of the iterations that have yielded responses indicating the corresponding state. Resolving the state for the given transaction responsive to results of the repeated polling in such an embodiment illustratively comprises resolving the state for the given transaction to one of the possible states responsive to the confidence counter for that possible state exceeding the confidence counter for at least one other one of the possible states.

In some embodiments of this type in which there are more than two possible states for the given transaction, resolving the state for the given transaction illustratively comprises resolving the state for the given transaction to one of the more than two possible states responsive to the confidence counter for that possible state exceeding the confidence counter for all of the other possible states. Other embodiments may specify additional or alternative requirements for resolving the state for the given transaction.

In some embodiments, a poll where a designated portion of the responses indicate a particular state for a transaction may implicitly indicate a particular state for a plurality of other, possibly related, transactions. For example, if the system decides that a first user Alice spent all of her cryptocurrency coins with a second user Bob, it may simultaneously decide that she did not spend them with a third user Charlie.

As noted above, the consensus protocol node 102-1 in illustrative embodiments maintains the DAG 134 of known transactions. The DAG 134 characterizes relationships between the given transaction and a plurality of other transactions. In some embodiments of this type, the transactions are partitioned into mutually exclusive conflict sets, where the notion of conflict is application-defined and can therefore vary from embodiment to embodiment based on factors such as the particular type of transactions being processed. Transactions that conflict with one another are referred to herein as forming a conflict set, out of which only a single transaction can be accepted. Such acceptance of a single transaction of a conflict set is an example of what is more generally referred to herein as "resolving the state" of that transaction.

Maintaining the DAG 134 in such an embodiment more particularly comprises selecting a sample of the consensus protocol nodes 102, sending queries to respective ones of the selected consensus protocol nodes 102, and updating the DAG 134 based at least in part on responses to the queries. For example, updating the DAG 134 comprises inserting one or more additional transactions into the DAG 134, updating confidence values for respective ones of the transactions of the DAG 134, and/or repartitioning the transactions of the DAG 134 into mutually exclusive conflict sets. Resolving the state for the given transaction responsive to results of the repeated polling in such an embodiment illustratively comprises resolving the state responsive to the given transaction being the only transaction in its conflict set and the given transaction having a confidence value that exceeds a threshold. As another example, resolving the state for the given transaction responsive to results of the repeated polling may comprise resolving the state to one of multiple possible states responsive to a confidence counter for that possible state exceeding a confidence counter for at least one other one of the possible states.

As mentioned above, each of the other consensus protocol nodes 102 is illustratively configured to operate in a manner similar to that described above for the consensus protocol node 102-1, so as to allow the consensus protocol nodes 102 to collectively reach consensus on a particular state for the given transaction from among the multiple possible states for the given transaction.

It is be appreciated that the particular arrangement of components and other system elements shown in FIG. 1 is presented by way of illustrative example only, and numerous alternative embodiments are possible. For example, one or more of the consensus protocol nodes 102 and client devices 104 can each comprise additional or alternative components, such as a cryptocurrency wallet utilized in conjunction with making or receiving cryptocurrency payments associated with a cryptocurrency account. Also, as indicated previously, a given processing device of the system 100 can in some embodiments comprise both a consensus protocol node and a client device. Other types of processing nodes, such as blockchain nodes, can additionally or alternatively be used. Numerous alternative arrangements of processing nodes and associated processing devices can be used.

It should also be understood that illustrative embodiments are not limited to use with blockchains or cryptocurrencies, or any other particular types of transactions. Accordingly, metastable consensus protocols of the type disclosed herein can be adapted in a straightforward manner for use with a wide variety of other types of transactions. The term "transaction" as used herein is therefore intended to be broadly construed, so as to encompass, for example, a command or script to be executed or any other type of information element suitable for resolution using the disclosed consensus protocols.

Additional details regarding the operation of illustrative embodiments will now be described with reference to FIGS. 2 through 9. The embodiments include an example family of metastable consensus protocols including variants referred to as Slush, Snowflake, Snowball and Avalanche. These protocol variants are considered respective illustrative embodiments, and so the particular details of their corresponding implementations as described below should not be construed as limiting in any way. Such protocol variants can also be viewed as more detailed implementations of the metastable consensus protocol arrangements of system 100 as described previously.

As indicated previously, conventional BFT protocols include the Nakamoto consensus protocols utilized in cryptocurrencies such as Bitcoin and Ethereum. Achieving agreement among a set of distributed processing nodes more generally lies at the core of countless applications, ranging from Internet-scale services that serve billions of people to cryptocurrencies worth billions of dollars.

To date, there have been two main families of solutions to this problem. Traditional consensus protocols rely on all-to-all communication to ensure that all correct nodes reach the same decisions with absolute certainty. Because they require quadratic communication overhead and accurate knowledge of membership, they have been difficult to scale to large numbers of participants.

On the other hand, Nakamoto consensus protocols provide a probabilistic safety guarantee: Nakamoto consensus decisions may revert with some probability E. A protocol parameter allows this probability to be rendered arbitrarily small, enabling high-value financial systems to be constructed on this foundation. This family is a natural fit for open, permissionless settings where any node can join the system at any time. Yet, these consensus protocols are costly, wasteful, and limited in performance. By construction, they cannot quiesce, in that their security relies on constant participation by miners, even when there are no decisions to be made. The mining associated with Bitcoin currently consumes energy at a rate of around 60 TWh/year. Moreover, these and other conventional BFT consensus protocols suffer from an inherent scalability bottleneck that is difficult to overcome through simple reparameterization.

The illustrative embodiments to be described in conjunction with FIGS. 2 through 9 below provide a new family of consensus protocols. Inspired by gossip algorithms, this family gains its safety through a deliberately metastable mechanism. Specifically, the system operates by repeatedly sampling the network at random, and steering correct nodes towards the same outcome. Analysis shows that this metastable mechanism is powerful: it can move a large network to a practically irreversible state quickly.

Similar to Nakamoto consensus, the protocol family in these illustrative embodiments provides a probabilistic safety guarantee, using a tunable security parameter that can render the possibility of a consensus failure arbitrarily small. Unlike Nakamoto consensus, the protocols are green, quiescent and efficient; they do not rely on proof-of-work and do not consume energy when there are no decisions to be made. The efficiency of the protocols in these illustrative embodiments is due at least in part to the following features: each node requires communication overheads ranging from $O(k \log n)$ to $O(k)$ for some small security parameter k (whereas leader-based consensus protocols have one or more nodes that require $O(n)$ communication), and the protocols establish only a partial order among dependent transactions.

As will be described in more detail below, the consensus protocols in these embodiments are illustratively configured to guarantee liveness only for "virtuous" transactions, i.e. those issued by correct clients and thus guaranteed not to conflict with other transactions. In a cryptocurrency setting, cryptographic signatures enforce that only a key owner is able to create a transaction that spends a particular coin. Since correct clients follow the protocol as prescribed, they are guaranteed both safety and liveness. In contrast, the protocols to be described do not guarantee liveness for rogue transactions, submitted by Byzantine clients, which conflict with one another. Such decisions may stall in the network, but have no safety impact on virtuous transactions. We show that this is a sensible tradeoff, and that resulting system is sufficient for building complex payment systems.

Accordingly, the illustrative embodiments provide a new family of consensus protocols, based on randomized sampling and metastable decision, with a strong probabilistic safety guarantee, and a guarantee of liveness for correct clients.

The description of the protocol family below starts with a non-Byzantine protocol, Slush, and progressively build up Snowflake, Snowball and Avalanche, all based on the same common metastable mechanism. Slush, Snowflake, and Snowball are single-decree binary consensus protocols of increasing robustness, and Avalanche extends Snowball into a full cryptocurrency solution. It will be apparent to those skilled in the art that other extensions for other applications are possible.

Like the Nakamoto consensus of Bitcoin, we adopt a safety guarantee that is probabilistic. This probabilistic guarantee is indistinguishable from traditional safety guarantees in practice, since appropriately small choices of ε can render consensus failure practically infeasible, less frequent than CPU miscomputations or hash collisions.

This protocol family collectively enables a system to implement a useful Bitcoin-like cryptocurrency, but with drastically better performance and scalability. It is possible in other embodiments to build other applications involving large-scale probabilistic consensus. We focus on a cryptocurrency application in these illustrative embodiments because of the many challenges it poses.

We assume a collection of nodes, $\mathcal{N}$, composed of correct nodes $\mathcal{C}$ and Byzantine nodes $\mathcal{B}$, where n=|$\mathcal{N}$|. For illustrative purposes, we adopt what is commonly known as Bitcoin's unspent transaction output (UTXO) model. In this model, clients are authenticated and issue cryptographically signed transactions that fully consume an existing UTXO and issue new UTXOs. Unlike nodes, clients do not participate in the decision process, but only supply transactions to the nodes running the consensus protocol. Two transactions conflict if they consume the same UTXO and yield different outputs. Correct clients never issue conflicting transactions, nor is it possible for Byzantine clients to forge conflicts with transactions issued by correct clients. However, Byzantine clients can issue multiple transactions that conflict with one another, and correct clients can only consume one of those transactions. The goal of the family of consensus protocols in these illustrative embodiments, then, is to accept a set of non-conflicting transactions in the presence of Byzantine behavior. Each client can be considered a replicated state machine (RSM) whose transitions are defined by a totally-ordered list of accepted transactions. Again, such acceptance for a given transaction is an example of what is more generally referred to herein as "resolving the state" for the given transaction.

The family of protocols provides the following guarantees with high probability ("whp"):

Property P1: Safety. No two correct nodes will accept conflicting transactions.

Property P2: Liveness. Any transaction issued by a correct client (a "virtuous transaction") will eventually be accepted by every correct node.

Instead of unconditional agreement, our approach guarantees that safety will be upheld with probability 1−ε, where the choice of the security parameter ε is under the control of the system designer and applications.

Our analysis for illustrative embodiments assumes a powerful adaptive adversary, for example, an adversary capable of observing the internal state and communications of every node in the network, but not capable of interfering with communication between correct nodes. We do not assume that all members of the network are known to all participants, but rather may temporarily have some discrepancies in network view. We assume a safe bootstrapping system, similar to that of Bitcoin, that enables a node to connect with sufficiently many correct nodes to acquire a statistically unbiased view of the network. We do not assume a public key infrastructure (PKI). We make standard cryptographic hardness assumptions related to public key signatures and hash functions.

FIG. 2 illustrates a simple metastable protocol, referred to herein as Slush, in an illustrative embodiment. Slush is not tolerant to Byzantine faults, but serves as an illustration for the BFT protocols that follow. For ease of exposition, we will describe the operation of Slush using a decision between two conflicting colors, red and blue. This decision regarding multiple possible values for a variable is an example of what is more generally referred to herein as resolving the state of a given transaction.

In Slush, a node starts out initially in an uncolored state. Upon receiving a transaction from a client, an uncolored node updates its own color to the one carried in the transaction and initiates a query. To perform a query, a node picks a small, constant sized (k) sample of the network uniformly at random, and sends a query message. Upon receiving a query, an uncolored node adopts the color in the query, responds with that color, and initiates its own query, whereas a colored node simply responds with its current color. Once the querying node collects k responses, or after a particular timeout is reached, it checks if a fraction ≥αk are for the same color, where α>0.5 is a protocol parameter. If the αk threshold is met and the sampled color differs from the node's own color, the node flips to that color. It then goes back to the query step, and initiates a subsequent round of query, for a total of m rounds. Finally, the node decides the color it ended up with at time m. It should be noted that timeouts are elided from the figure for readability.

This simple protocol has a number of desirable properties. First, it is almost memoryless: a node retains no state between rounds other than its current color, and in particular maintains no history of interactions with other peers. Second, unlike traditional consensus protocols that query every participant, every round involves sampling just a small, constant-sized slice of the network at random. Third, even if the network starts in the metastable state of a 50/50 red-blue split, random perturbations in sampling will cause one color to gain a slight edge and repeated samplings afterwards will build upon and amplify that imbalance. Finally, if m is chosen high enough, Slush ensures that all nodes will be colored identically whp. Each node has a constant, predictable communication overhead per round, and m grows logarithmically with n.

The Slush protocol does not provide a strong safety guarantee in the presence of Byzantine nodes. In particular, if the correct nodes develop a preference for one color, a Byzantine adversary can attempt to flip nodes to the opposite color so as to keep the network in balance, preventing a decision. We address this in our first BFT protocol that introduces more state storage at the nodes.

FIG. 3 shows a metastable consensus protocol with BFT, built on the Slush protocol previously described. Snowflake augments Slush with a single counter that captures the strength of a node's conviction in its current color. Such a counter is an example of what is also referred to herein as a "conviction counter." This per-node counter stores how many consecutive samples of the network by that node have all yielded the same color. A node accepts the current color when its counter exceeds β, another security parameter. The FIG. 3 protocol includes the following modifications:
1. Each node maintains a counter cnt;
2. Upon every color change, the node resets cnt to 0;
3. Upon every successful query that yields ≥αk responses for the same color as the node, the node increments cnt.

When the protocol is correctly parameterized for a given threshold of Byzantine nodes and a desired E-guarantee, it can ensure both property P1 (safety) and property P2 (liveness). As we later show, there exists a phase-shift point after which correct nodes are more likely to tend towards a decision than a bivalent state. Further, there exists a point-of-no-return after which a decision is inevitable. The Byzantine nodes lose control past the phase shift, and the correct nodes begin to commit past the point-of-no-return, to adopt the same color, whp.

FIG. 4 shows the next protocol, referred to as Snowball, which adds an indication of confidence to Snowflake. Snowflake's notion of state is ephemeral: the counter gets reset with every color flip. While, theoretically, the protocol is able to make strong guarantees with minimal state, we will now improve the protocol to make it harder to attack by incorporating a more permanent notion of belief. Snowball augments Snowflake with confidence counters that capture the number of queries that have yielded a threshold result for their corresponding color, as illustrated in the figure. A node decides if it gets β consecutive "chits" for a color, where such chits are described in more detail elsewhere herein. However, the node only changes preference based on the total accrued confidence. The differences between Snowflake and Snowball are as follows:
1. Upon every successful query (i.e., at least αk responses matching the color of the node), the node increments its confidence counter for that color.
2. A node switches colors when the confidence in its current color becomes lower than the confidence value of the new color.

Snowball is not only harder to attack than Snowflake, but is more easily generalized to multi-decree protocols.

Figure 8:
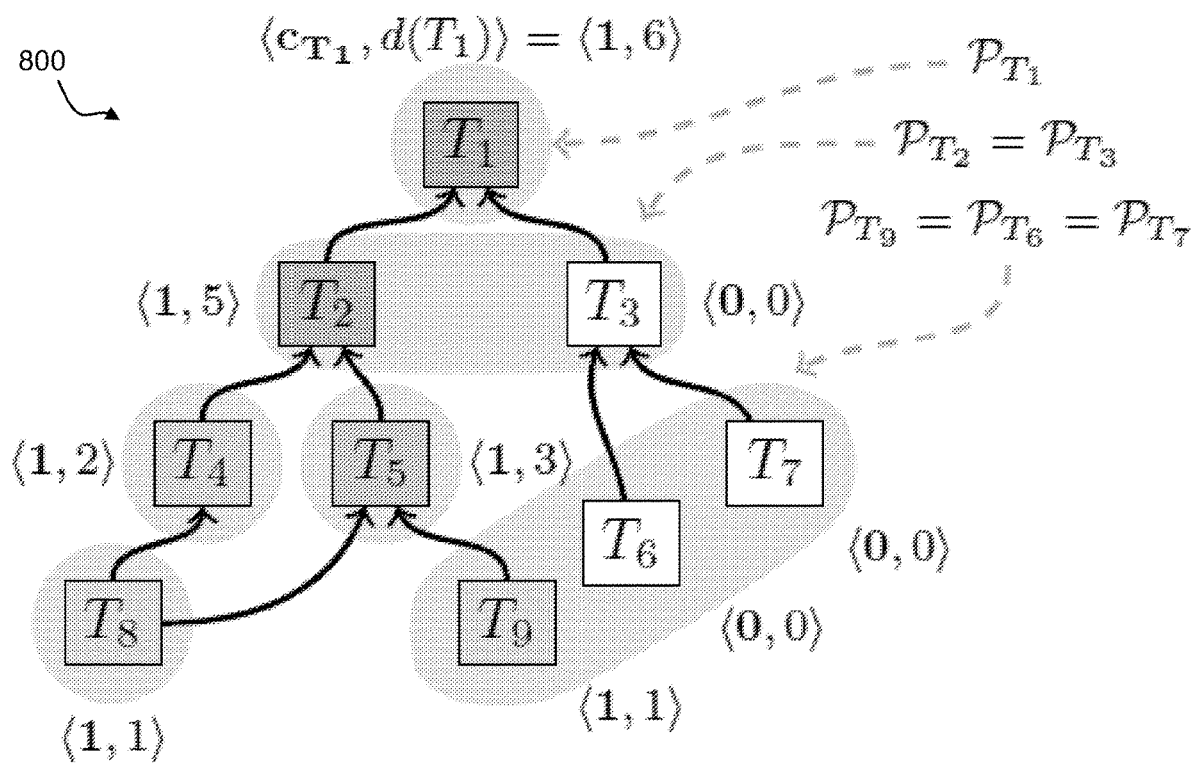
FIGS. 8 and 9 show examples of DAGs generated in accordance with consensus protocols in illustrative embodiments.
Figure 9:
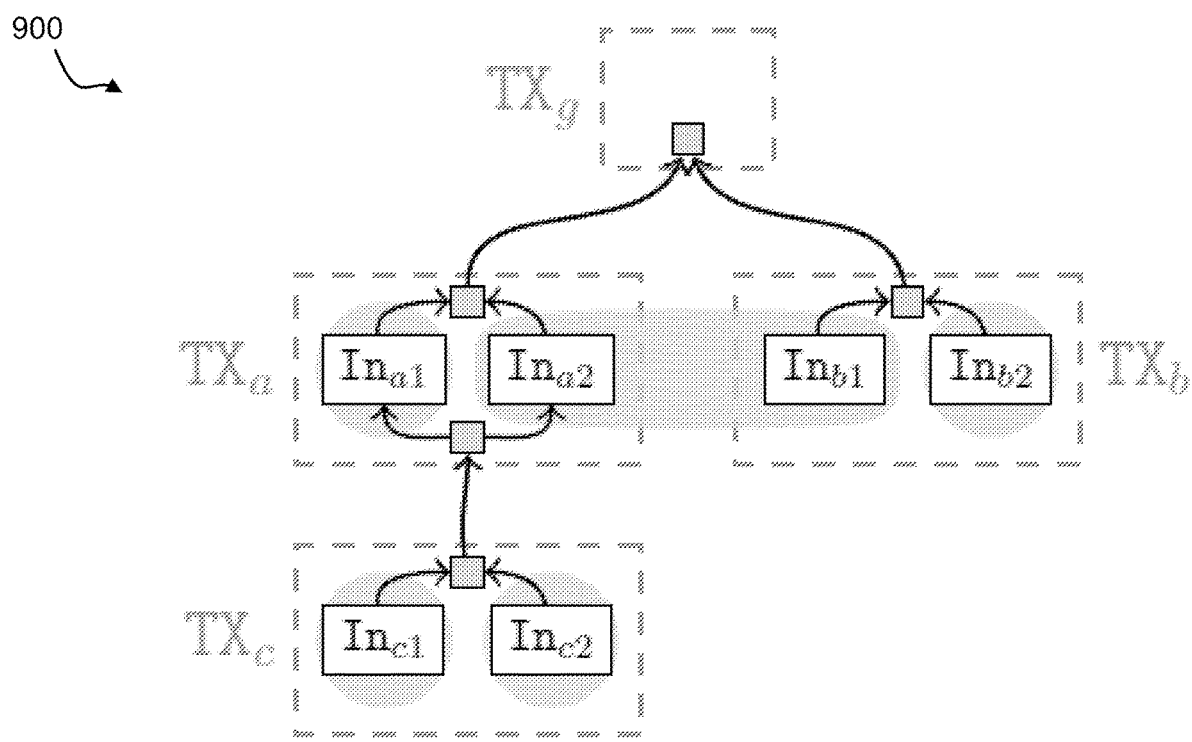

FIGS. 5, 6 and 7 show respective portions of a further protocol, referred to as Avalanche, which extends Snowball to a multi-decree protocol that maintains a DAG of all known transactions. The DAG has a single sink that is referred to as a "genesis vertex." Examples of DAGs are shown in FIGS. 8 and 9. Maintaining a DAG provides two significant benefits. First, it improves efficiency, because a single vote on a DAG vertex implicitly votes for all transactions on the path to the genesis vertex. Second, it also improves security, because the DAG intertwines the fate of transactions, similar to the Bitcoin blockchain. This renders past decisions difficult to undo without the approval of correct nodes.

When a client creates a transaction, it names one or more parents, which are included inseparably in the transaction and form the edges of the DAG. The parent-child relationships encoded in the DAG may, but do not need to, correspond to application-specific dependencies; for instance, a child transaction need not spend or have any relationship with the funds received in the parent transaction. We use the term "ancestor set" to refer to all transactions reachable via parent edges back in history, and the term "progeny" to refer to all children transactions and their offspring.

The central challenge in the maintenance of the DAG is to choose among conflicting transactions. As mentioned previously, the notion of conflict herein is illustratively application-defined, and can therefore vary from embodiment to embodiment. In our cryptocurrency application, transactions that spend the same funds (double-spends) conflict with one another, and form a conflict set (shaded regions in FIG. 8), out of which only a single one can be accepted. Note that the conflict set of a virtuous transaction is always a singleton.

Avalanche embodies a Snowball instance for each conflict set. Whereas Snowball uses repeated queries and multiple counters to capture the amount of confidence built in conflicting transactions (colors), Avalanche takes advantage of the DAG structure and uses a transaction's progeny. Specifically, when a transaction T is queried, all transactions reachable from T by following the DAG edges are implicitly part of the query. A node will only respond positively to the query if T and its entire ancestry are currently the preferred option in their respective conflict sets. If more than a threshold of responders vote positively, the transaction is said to collect what is referred to herein as a "chit." Nodes then compute their confidence as the total number of chits in the progeny of that transaction. They query a transaction just once and rely on new vertices and possible chits, added to the progeny, to build up their confidence. Ties are broken by an initial preference for first-seen transactions. Note that chits are decoupled from the DAG structure, making the protocol immune to attacks where the attacker generates large numbers of DAG vertices.

In Avalanche, each correct node u keeps track of all transactions it has learned about in set $\mathcal{T}_u$, partitioned into mutually exclusive conflict sets $\mathcal{P}_T, T \in \mathcal{T}_u$. Since conflicts are transitive, if $T_i$ and $T_j$ are conflicting, then they belong to the same conflict set, i.e. $\mathcal{P}_{T_i} = \mathcal{P}_{T_j}$. This relation may sound counter-intuitive: conflicting transitions have the equivalence, because they are equivocations spending the same funds.

We write T'←T if T has a parent edge to transaction T'. The "$\stackrel{*}{\leftarrow}$"-relation is its reflexive transitive closure, indicating a path from T to T'. DAGs built by different nodes are guaranteed to be compatible. Specifically, if T'←T, then every node in the system that has T will also have T' and the same relation T'←T; and conversely, if T' ↚ T, then no nodes will end up with T'←T. Each node u can compute a confidence value, $d_u(T)$, from the progeny as follows:

$$d_u(T) = \sum_{T' \in \mathcal{T}_u, T \stackrel{*}{\leftarrow} T'} C_{uT'}$$

where $C_{uT'}$ stands for the chit value of T' for node u. Each transaction initially has a chit value of 0 before the node gets the query results. If the node collects a threshold of αk yes-votes after the query, the value $C_{uT'}$ is set to 1, and otherwise remains 0 forever. Therefore, a chit value reflects the result from the one-time query of its associated transaction and becomes immutable afterwards, while d(T) can increase as the DAG grows by collecting more chits in its progeny. Because $c_T \in \{0,1\}$, confidence values are monotonic.

In addition, node u maintains its own local list of known nodes $\mathcal{N}_u \subseteq \mathcal{N}$ that comprise the system. For simplicity of illustration below, we assume for now $\mathcal{N}_u = \mathcal{N}$, and elide subscript u in contexts without ambiguity.

Each node implements an event-driven state machine, centered around a query that serves both to solicit votes on each transaction and to notify other nodes of the existence of newly discovered transactions. In particular, when node u discovers a transaction T through a query, it starts a one-time query process by sampling k random peers and sending a message to them, after T is delivered via the procedure ONRECEIVETX of FIG. 6.

Node u answers a query by checking whether each T' such that $T' \overset{*}{\leftarrow} T$ is currently preferred among competing transactions $\forall T' \mathcal{P}_{T'}$. If every single ancestor T' fulfills this criterion, the transaction is said to be strongly preferred, and receives a yes-vote (1). A failure of this criterion at any T' yields a no-vote (0). When u accumulates k responses, it checks whether there are αk yes-votes for T, and if so grants the chit (chit value $C_T:=1$) for T. The above process will yield a labeling of the DAG with a chit value and associated confidence for each transaction T.

FIG. 8 illustrates an example DAG 800 built by Avalanche, showing an example of ⟨chit, confidence⟩ values. Darker boxes indicate transactions with higher confidence values. At most one transaction in each shaded region will be accepted. Similar to Snowball, sampling in Avalanche will create a positive feedback for the preference of a single transaction in its conflict set. For example, because $T_2$ has larger confidence than $T_3$, its descendants are more likely to collect chits in the future compared to $T_3$.

Similar to Bitcoin, Avalanche leaves determining the acceptance point of a transaction to the application. An application supplies an ISACCEPTED predicate that can take into account the value at risk in the transaction and the chances of a decision being reverted to determine when to decide.

Committing a transaction can be performed through what is referred to herein as a "safe early commitment." For virtuous transactions, T is accepted when it is the only transaction in its conflict set and has a confidence greater than a threshold $\beta_1$. As in Snowball, T can also be accepted after a threshold number $\beta_2$ of consecutive successful queries. If a virtuous transaction fails to get accepted due to a liveness problem with parents, it could be accepted if reissued with different parents.

The pseudocode shown in FIG. 6 illustrates how Avalanche performs parent selection and entangles transactions. Because transactions that consume and generate the same UTXO do not conflict with each other, any transaction can be reissued with different parents.

The Avalanche protocol main loop executed by each node is illustrated by the pseudocode of FIG. 5. In each iteration, the node attempts to select a transaction T that has not yet been queried. If no such transaction exists, the loop will stall until a new transaction is added to $\mathcal{T}$. It then selects k peers and queries those peers. If more than αk of those peers return a positive response, the chit value is set to 1. After that, it updates the preferred transaction of each conflict set of the transactions in its ancestry. Next, T is added to the set Q so it will never be queried again by the node. The code that selects additional peers if some of the k peers are unresponsive is omitted for simplicity, but can be implemented in a straightforward manner, as will be appreciated by those skilled in the art.

FIG. 7 shows what happens when a node receives a query for transaction T from peer j. First it adds T to $\mathcal{T}$, unless the latter already has it. Then it determines if T is currently strongly preferred. If so, the node returns a positive response to peer j. Otherwise, it returns a negative response. Notice that in the pseudocode, we assume when a node knows T, it also recursively knows the entire ancestry of T. This can be achieved by postponing the delivery of T until its entire ancestry is recursively fetched. In practice, an additional gossip process that disseminates transactions is used in parallel, but is not shown in pseudocode for simplicity.

It can be shown that under certain independent and distinct assumptions, the Avalanche family of consensus protocols described above provide property P1 (safety) and property P2 (liveness) with probability 1-ε, where ε is a security parameter that can be set according to the needs of the system designer.

The above-described consensus protocol family will now be analyzed in detail with regard to properties P1 and P2, as well as other features.

With regard to property P1, we analyze the protocols through the view of a global scheduler, also referred to as a system scheduler. Like Bitcoin and other blockchain protocols based on gossip dissemination, we assume that gossip spreads to all correct nodes within a known time bound. In other words, we assume a synchronous communication network, where the system makes progress in rounds, and where at the beginning of each round the global scheduler chooses a single correct node u uniformly at random. Node u will sample and update its state by the end of the round. The Byzantine adversary will be aware of the identity of u. Furthermore, the adversary has full knowledge of the internal state of all nodes in the network at all times, and is able to fully update the state of all nodes under its control immediately after u chooses its neighbor sample set. In essence, the adversary is only constrained by an inability to directly update the state of correct nodes.

We can think of the network as a set of nodes colored either red or blue. Each new round will update the state of one of the nodes, either changing its color, or increasing its confidence in its current color. The dynamics of the system resemble those of epidemic networks, where nodes update their state based on the state of their neighbors, using a function chosen over some probability distribution. It would be infeasible to keep track of all possible execution paths, since at every round, the possible number of branching executions is equal to the number of possible correct nodes times all possible k-sample choices of outcomes that the node may sample. Furthermore, the difficulty of this task is greatly amplified due to the Byzantine adversary, whose optimal attack strategy is chosen over an unknown function, possibly itself nondeterministic.

The simplification that allows us to analyze this system is to obviate the need to keep track of all of the execution paths, as well as all possible adversarial strategies, and rather focus entirely on a single state of interest, without regards to how we achieve this state. More specifically, the core extractable insight of our analysis is in identifying the irreversibility state of the system, the state upon which so many correct nodes have usurped either red or blue that reverting back to the minority color is highly unlikely.

We model the Slush protocol through a birth-death Markov process with two absorbing states, where either all nodes are red or all nodes are blue. In our construction, all states (excluding absorbing states) are transient, meaning that there is a nonzero probability of never returning to that state. Our analysis shows that the Slush protocol reaches, in finite time, an absorbing state with non-zero probability. Furthermore, the probability of convergence to one of the two colors can be precisely measured using only a local round counter. In fact, Slush converges to a decision in close to logarithmic steps whp.

For Snowflake, we relax the assumption that all nodes are correct and assume that some fraction of nodes are adversarial. An important insight is that there exists an irreversible state, or point of no return, after which the system will converge to an absorbing state whp. Furthermore a correct node only decides when the system is beyond the point of no return. Composing these two guarantees together, the probability of a safety violation is strictly less than E, which can be configured as desired. Unsurprisingly, there is an inherent tension between safety and liveness, but suitable parameters can be found that are practical. Larger values of k obtain higher levels of security for correct nodes, at the expense of slower convergence.

Snowball is an improvement over Snowflake, where random perturbations in network samples are reduced by introducing a partial form of history, which we refer to as confidence. Modeling Snowball with a Markov chain is difficult because of a state space explosion problem. In particular, it is not sufficient to simply keep track of color preferences of each correct node, the analysis must also maintain information about their confidence. To make analysis possible, we structure the mathematical foundations via a game of balls and urns, where each urn represents one of the correct nodes, and the ball count correspond to confidences in either color. Using this model, the analysis applies various tail inequalities to prove that the safety guarantees of Snowball are strictly stronger than those of Snowflake. In particular, once the system has reached the point of no return, the probability of reverting is strictly lower than in Snowflake.

Lastly, the safety guarantees of Snowball can be mapped to those of Avalanche, which is a concrete instantiation of Snowball using a DAG to amortize cost. We note that the structure of the Avalanche DAG itself does not correspond to votes, which is a subtle difference between other consensus protocols that make usage of a DAG. The DAG is merely a performance optimization, and is itself entirely orthogonal to the consensus process.

With regard to property P2, we note that both Snowflake and Snowball make use of a counter to keep track of consecutive majority support. Since the adversary is unable to forge a conflict for a virtuous transaction, initially, all correct nodes will have color red or $\perp$, where $\perp$ denotes "not yet defined." A Byzantine node cannot respond to any query with any answer other than red since it is unable to forge conflicts and $\perp$ is not allowed by protocol. Therefore, the only misbehavior for the Byzantine node is refusing to answer. Since the correct node will re-sample if the query times out, by expected convergence, all correct nodes will terminate with the unanimous red value within a finite number of rounds whp.

Avalanche introduces a DAG structure that entangles the fate of unrelated conflict sets, each of which is a single-decree instance. This entanglement embodies a tension: attaching a virtuous transaction to undecided parents helps propel transactions towards a decision, while it puts transactions at risk of suffering liveness failures when parents turn out to be rogue. We can resolve this tension and provide a liveness guarantee with the aid of two mechanisms.

First, we utilize an adaptive parent selection strategy, where transactions are attached at the live edge of the DAG, and are retried with new parents closer to the genesis vertex. This procedure is guaranteed to terminate with uncontested, decided parents, ensuring that a transaction cannot suffer liveness failure due to contested, rogue transactions. A secondary mechanism ensures that virtuous transactions with decided ancestry will receive sufficient chits. Correct nodes examine the DAG for virtuous transactions that lack sufficient progeny and emit no-operation ("nop") transactions to help increase their confidence. With these two mechanisms in place, it is easy to see that, at worst, Avalanche will degenerate into separate instances of Snowball, and thus provide the same liveness guarantee for virtuous transactions.

Additional insights regarding the family of protocols in the above-described illustrative embodiments include the following.

First, the protocols lead to both safety and liveness guarantees whose underlying function is smooth, rather than a step function. In many other consensus protocols, safety is guaranteed with up to a fixed threshold number (e.g., $\frac{1}{3}$) of adversarial nodes, beyond which no guarantees are provided. In our protocols, the guarantees degrade gracefully with an adversarial percentage beyond the pre-established bound. For example, optimal system parameters can be chosen to tolerate precisely $\frac{1}{5}$ adversarial presence with failure probability E. However, if the system faces an adversarial presence greater than $\frac{1}{5}$, then the probability of failure degrades to slightly above E, rather than immediately to 1.

Second, these protocols externalize the safety and liveness tradeoffs. The system designer may choose to guarantee safety even under catastrophic events, such as an adversarial presence beyond $\frac{1}{2}$, at the expense of liveness. This presents a powerful adjustment not available in classical or Nakamoto-based consensus protocols.

There are a multitude of attack vectors against consensus protocols. We now consider the two most important ones, Sybil attacks and flooding attacks.

With regard to Sybil attacks, consensus protocols typically provide their guarantees based on assumptions that only a fraction of participants are adversarial. These bounds could be violated if the network is naively left open to arbitrary participants. In particular, a Sybil attack, wherein a large number of identities are generated by an adversary, could be used to exceed the adversarial bound. The Sybil problem is typically treated separately from consensus, and rightfully so, as Sybil control mechanisms are distinct from the underlying, more complex agreement protocol, although this does not imply that every consensus protocol can be coupled with every Sybil control mechanism. Nakamoto consensus, for instance, uses proof-of-work to limit Sybils, which requires miners to continuously stake a hardware investment. Other protocols rely on proof-of-stake or proof-of-authority. The consensus protocols described in the illustrative embodiments above can adopt any Sybil control mechanism, although proof-of-stake is most aligned with their quiescent operation. Control mechanisms such as proof-of-stake and proof-of-authority avoid the energy inefficiencies associated with proof-of-work. Cryptocurrencies can be implemented using the consensus protocols disclosed herein in combination with these and other control mechanisms to address Sybil attacks.

With regard to flooding attacks, such attacks are a potential problem for any distributed system. Without a protection mechanism, an attacker can generate large numbers of transactions and flood the DAG, consuming storage. There are a multitude of techniques to deter such attacks, including network-layer protections, proof-of-authority, or economic mechanisms. In Avalanche, we use transaction fees, making such attacks costly even if the attacker is sending money back to addresses under its control.

With regard to communication complexity, since liveness is not guaranteed for rogue transactions, we focus our message complexity analysis solely for the case of virtuous transactions. For the case of virtuous transactions, Snowflake and Snowball are both guaranteed to terminate after O(kn log n) messages. This follows from well-known results related to epidemic algorithms. Communication complexity for Avalanche is more subtle. Let the DAG induced by Avalanche have an expected branching factor of p, corresponding to the width of the DAG, and determined by the parent selection algorithm. Given the β decision threshold, a transaction that has just reached the point of decision will have an associated progeny $\mathcal{Y}$. Let m be the expected depth of $\mathcal{Y}$. If we were to let the Avalanche network make progress and then freeze the DAG at a depth y, then it will have roughly py vertices/transactions, of which p(y−m) are decided in expectation. Only pm recent transactions would lack the progeny required for a decision. For each node, each query requires k samples, and therefore the total message cost per transaction is in expectation (pky)/(p(y−m))=ky/(y−m). Since m is a constant determined by the undecided region of the DAG as the system constantly makes progress, message complexity per node is O(k), while the total complexity is O(kn).

In order to evaluate the operation of illustrative embodiments, we fully ported Bitcoin transactions to Avalanche, and implemented a bare-bones payment system. We will describe below how this example implementation can support the value transfer primitive at the center of cryptocurrencies and then examine its throughput, scalability, and latency through a large scale deployment on Amazon AWS, and finally, provide a comparison to known results from other systems.

It is to be appreciated that the particular features, parameters and other configuration details of this example system are presented for purposes of illustration only, and should not be considered requirements or limitations. It should also be noted that deploying a full cryptocurrency generally involves functionality such as bootstrapping, minting, staking, unstaking, and inflation control. Known techniques can be adapted in a straightforward manner to address such issues, to the extent not expressly addressed herein.

It is assumed for description of the example implementation that the transactions comprise UTXO transactions. In addition to the DAG structure in Avalanche, a UTXO graph that captures spending dependency is used to realize the ledger for the payment system. To avoid ambiguity, we denote the transactions that encode the data for money transfer transactions, while we call the transactions (T∈$\mathcal{T}$) in Avalanche's DAG vertices.

We inherit the transaction and address mechanisms from Bitcoin. At their simplest, transactions consist of multiple inputs and outputs, with corresponding redeem scripts. Addresses are identified by the hash of their public keys, and signatures are generated by corresponding private keys. The full scripting language is used to ensure that a redeem script is authenticated to spend a UTXO. UTXOs are fully consumed by a valid transaction, and may generate new UTXOs spendable by named recipients. Multi-input transactions consume multiple UTXOs, and in Avalanche, may appear in multiple conflict sets. To account for these correctly, we represent transaction-input pairs (e.g., $In_{\alpha1}$) as Avalanche vertices.

FIG. 9 shows an example DAG 900 configured in accordance with the logical DAG structure used by Avalanche in the present embodiment. The tiny squares with shading are dummy vertices which just help form the DAG topology for the purpose of clarity, and can be replaced by direct edges. The rounded gray regions are the conflict sets.

The conflict relation of transaction-input pairs are transitive because of each pair only spends one unspent output. We use the conjunction of IsAccepted for all inputs of a transaction to ensure that no transaction will be accepted unless all its inputs are accepted, as illustrated in FIG. 9. Following this idea, we finally implement the DAG of transaction-input pairs such that multiple transactions can be batched together per query.

We implement a number of optimizations to help the system scale. First, we use lazy updates to the DAG, because the recursive definition for confidence may otherwise require a costly DAG traversal. We maintain the current d(T) value for each active vertex on the DAG, and update it only when a descendant vertex gets a chit. Since the search path can be pruned at accepted vertices, the cost for an update is constant if the rejected vertices have limited numbers of descendants and the undecided region of the DAG stays at constant size. Second, the conflict set could be very large in practice, because a rogue client can generate a large volume of conflicting transactions. Instead of keeping a container data structure for each conflict set, we create a mapping from each UTXO to the preferred transaction that stands as the representative for the entire conflict set. This enables a node to quickly determine future conflicts, and the appropriate response to queries. Finally, we speed up the query process by terminating early as soon as the αk threshold is met, without waiting for k responses.

The above-described example implementation was tested on Amazon EC2 by running from hundreds (125) to thousands (2000) of virtual machine instances. We use c5.large instances, each of which simulates an individual node. AWS provides bandwidth of up to 2 Gbps, though the Avalanche protocol utilizes at most around 100 Mbps.

Our example implementation supports two versions of transactions: one is the customized UTXO format, while the other uses the code directly from Bitcoin 0.16. Both supported formats use the secp256k1 crypto library from Bitcoin and provide the same address format for wallets. All simulations use the customized format except for the geo-replication, where results for both are given.

We simulate a constant flow of new transactions from users by creating separate client processes, each of which maintains separated wallets, generates transactions with new recipient addresses and sends the requests to Avalanche nodes. We use several such client processes to max out the capacity of our system. The number of recipients for each transaction is tuned to achieve average transaction sizes of around 250 bytes (1-2 inputs/outputs per transaction on average and a stable UTXO size), the current average transaction size of Bitcoin. To utilize the network efficiently, we batch up to 40 transactions during a query, but maintain confidence values at individual transaction granularity.

All reported metrics reflect end-to-end measurements taken from the perspective of all clients. That is, clients examine the total number of confirmed transactions per second for throughput, and, for each transaction, subtract the initiation timestamp from the confirmation timestamp for latency. For security parameters, we utilized k=10, α=0.8, $\beta_1$=11, $\beta_2$=150, which yields an MTTF of ~1024 years. Other security parameters can be used in other embodiments.

We first measure the throughput of the system by saturating it with transactions and examining the rate at which transactions are confirmed in the steady state. For this experiment, we first run Avalanche on 125 nodes with 10 client processes, each of which maintains 400 outstanding transactions at any given time.

It was found that the system achieves 6851 transactions per second (tps) for a batch size of 20 and above 7002 tps for a batch size of 40. The system is saturated by a small batch size compared to other blockchains with known performance: Bitcoin batches several thousands of transactions per block, Algorand uses 2-10 Mbyte blocks, i.e., 8.4-41.9K tx/batch and Conflux uses 4 Mbyte blocks, i.e., 16.8K tx/batch. These conventional systems are relatively slow in making a single decision, and thus require a very large batch (block) size for better performance. Achieving high throughput with small batch size implies low latency, as will be described in more detail below.

To examine how the system scales in terms of the number of nodes participating in Avalanche consensus, we run experiments with identical settings and vary the number of nodes from 125 up to 2000.

It was found that overall throughput degrades about 1.34% to 6909 tps when the network grows by a factor of 16 to n=2000, with signature verification enabled. This degradation is minor compared to the fluctuation in performance of repeated runs.

Avalanche acquires its scalability from three sources: first, maintaining a partial order that captures only the spending relations allows for more concurrency than a classical BFT replicated log that linearizes all transactions; second, the lack of a leader naturally avoids bottlenecks; finally, the number of messages each node has to handle per decision is O(k) and does not grow as the network scales up.

We next examine where bottlenecks lie in our example implementation. With signature verification disabled, throughputs get approximately 2.6× higher. This indicates that cryptographic verification overhead is the current bottleneck in our example implementation. This bottleneck can be addressed by offloading transaction verification to a GPU. Even without such optimization, 7K tps is far in excess of extant blockchains.

With regard to latency, we define the latency of a transaction as the time spent from the moment of its submission until it is confirmed as accepted. Our simulations on the example implementation indicate that, using the same setup as for the throughput measurements with 2000 nodes, most transactions are confirmed within approximately 0.3 seconds. The most common latencies are around 206 ms and variance is low, indicating that nodes converge on the final value as a group around the same time. The maximum latency we observed in these simulations is about 0.4 seconds.

We also simulated transaction latencies for different numbers of nodes. It was found that median latency is more-or-less independent of network size.

We next examine how rogue transactions issued by misbehaving clients that double spend unspent outputs can affect latency for virtuous transactions created by honest clients. We adopt a strategy to simulate misbehaving clients where a fraction (from 0% to 25%) of the pending transactions conflict with some existing ones. The client processes achieve this by designating some double spending transaction flows among all simulated pending transactions and sending the conflicting transactions to different nodes. We use the same setup with n=1000 as in the previous experiments, and only measure throughput and latency of confirmed transactions.

It was found that Avalanche's latency is only slightly affected by misbehaving clients. Surprisingly, maximum latencies drop slightly when the percentage of rogue transactions increases. This behavior occurs because, with the introduction of rogue transactions, the overall effective throughput is reduced and thus alleviates system load. Also, throughput of virtuous transactions decreases with the ratio of rogue transactions. Further, the reduction in throughput appears proportional to the number of misbehaving clients, that is, there is no leverage provided to the attackers.

With regard to geo-replication, we selected 20 major cities that appear to be near substantial numbers of reachable Bitcoin nodes. The cities cover North America, Europe, West Asia, East Asia, Oceania, and also cover the top 10 countries with the highest number of reachable nodes. We use a latency and jittering matrix based on global ping statistics from WonderNetwork nodes and emulate network packet latency in the Linux kernel using tc and netem. We assume 2000 nodes distributed evenly to each city, with no additional network latency emulated between nodes within the same city. We cap our bandwidth per process to 20 Mbps to simulate internet-scale settings where there are many commodity network links. We assign a client process to each city, maintaining 400 outstanding transactions per city at any moment.

In this scenario, Avalanche achieves an average throughput of 3401 tps, with a standard deviation of 39 tps. The median transaction latency is 1.35 seconds, with a maximum latency of 4.25 seconds. We also support native Bitcoin code for transactions; in this case, the throughput is 3530 tps, with $\sigma$=92 tps.

The example system described above was compared to conventional Algorand and Conflux systems. Algorand, Conflux, and Avalanche are all fundamentally different in their design. Algorand's committee-scale consensus algorithm falls into the classical BFT consensus category, and Conflux extends Nakamoto consensus by a DAG structure to facilitate higher throughput, while Avalanche belongs to a new protocol family based on metastability. Additionally, we use Bitcoin as a baseline.

Both Algorand and Avalanche evaluations use a decision network of size 2000 on EC2. Our evaluation picked shared c5.large instances, while Algorand used m4.2×large. These two platforms are very similar except for a slight CPU clock speed edge for c5.large, which goes largely unused because our process only consumes 30% in these experiments. The security parameters chosen in our experiments guarantee a safety violation probability below $10^{-9}$ in the presence of 20% Byzantine nodes, while Algorand's evaluation guarantees a violation probability below $5 \times 10^{-9}$ with 20% Byzantine nodes.

Neither Algorand nor Conflux evaluations take into account the overhead of cryptographic verification. Their evaluations use blocks that carry megabytes of dummy data and present the throughput in MB/hour or GB/hour unit. So we use the average size of a Bitcoin transaction (and also our transaction), 250 bytes, to derive their throughputs. In contrast, our experiments carry real transactions and fully take all cryptographic overhead into account.

The throughput is 3-7 tps for Bitcoin, 874 tps for Algorand (with 10 Mbyte blocks), and 3355 tps for Conflux (i.e., 3.84× Algorand's throughput under the same settings).

In contrast, Avalanche achieves over 3400 tps consistently on up to 2000 nodes without committee or proof-of-work. As for latency, a transaction is confirmed after 10-60 minutes in Bitcoin, around 50 seconds in Algorand, 7.6-13.8 minutes in Conflux, and 1.35 seconds in Avalanche.

Avalanche performs much better than Algorand in both throughput and latency because Algorand uses a verifiable random function to elect committees, and maintains a totally-ordered log while Avalanche establishes only a partial order. Algorand is leader-based and performs consensus by committee, while Avalanche is leader-less.

Avalanche has similar throughput to Conflux, but its latency is 337-613× better. Conflux also uses a DAG structure to amortize the cost for consensus and increase the throughput, however, it is still rooted in Nakamoto consensus using proof-of-work, and is therefore unable to provide the very short confirmation time of Avalanche.

In a blockchain system, one can usually improve throughput at the cost of latency through batching. The real bottleneck of the performance is the number of decisions the system can make per second, and this is fundamentally limited by either Byzantine Agreement (BA*) in Algorand and Nakamoto consensus in Conflux.

It is apparent from the above description that illustrative embodiments provide significant advantages relative to conventional consensus protocols.

For example, the new family of consensus protocols described in the illustrative embodiments above are highly efficient and robust. They scale well, achieve high throughput and quick finality, work without precise membership knowledge, and degrade gracefully under catastrophic adversarial attacks.

Such embodiments more particularly comprise a family of leaderless Byzantine fault tolerance protocols, built around a metastable mechanism. The protocols provide a strong probabilistic safety guarantee in the presence of Byzantine adversaries, while their concurrent nature enables them to achieve high throughput and scalability. Unlike blockchains that rely on proof-of-work, they are quiescent and green. Unlike traditional consensus protocols having leader nodes that process O(n) information (in terms of number of bits exchanged), no node processes more than O(k) for some security parameter k.

The consensus protocols disclosed herein can be used in a wide variety of different applications. For example, the consensus protocols can provide improved performance in cryptocurrencies and other blockchain applications. The above-described experiments demonstrate that example implementations can achieve high throughput (3400 tps), provide low confirmation latency (1.35 sec), and scale well compared to existing systems that deliver similar functionality.

It is be appreciated that the particular arrangements shown and described in conjunction with FIGS. 1 through 9 are presented by way of illustrative example only, and numerous alternative embodiments are possible. The various embodiments disclosed herein should therefore not be construed as limiting in any way. Numerous alternative arrangements for implementing metastable consensus protocols can be utilized in other embodiments.

For example, the particular processing operations of the example protocols as illustrated in FIGS. 2 through 7 can be varied in other embodiments.

As another example, the synchrony assumption in certain embodiments described above can be relaxed in other embodiments, and it is expected that strong guarantees are possible even under asynchrony.

Those skilled in the art will also recognize that many other alternative arrangements of processing operations and associated system entity configurations can be used in other embodiments.

It is therefore possible that other embodiments may include additional or alternative system entities, relative to the entities of the illustrative embodiments. Also, the particular system and device configurations and associated metastable consensus protocols can be varied in other embodiments.

It should also be noted that the above-described information processing system arrangements are exemplary only, and alternative system arrangements can be used in other embodiments.

A given client, server, processing node or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a GPU, a DSP, or other similar processing device component, as well as other types and arrangements of processing circuitry, in any combination. For example, a given cryptographic processing module of a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with metastable consensus protocols as well as other related functionality.

Processing devices in a given embodiment can include, for example, laptop, tablet or desktop personal computers, mobile telephones, or other types of computers or communication devices, in any combination. For example, a computer or mobile telephone can be utilized as a processing device for participating in a metastable consensus protocol as disclosed herein. These and other communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality associated with metastable consensus protocol entities or related components of a system can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

Thus, techniques illustrated in some embodiments herein in the context of providing metastable consensus protocols in the context of cryptocurrencies can be adapted in a straightforward manner for use in other contexts. Accordingly, illustrative embodiments of the invention should not be viewed as limited to cryptocurrencies or their associated processing contexts.

It is also to be appreciated that the particular process steps used in the embodiments described herein are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. An apparatus comprising:
a first processing node comprising a processor coupled to a memory;
the first processing node being configured to participate in a consensus protocol with additional processing nodes, the first processing node and the additional processing nodes comprising respective processing devices configured to communicate with one another over at least one network;
the first processing node being further configured in conjunction with its participation in the consensus protocol:
to determine an initial state for a given transaction based at least in part on one or more of a plurality of possible states for the given transaction;
to implement repeated polling of respective distinct selected subsets of the additional processing nodes, each of the distinct selected subsets comprising fewer than all of the additional processing nodes, with at least portions of results of the repeated polling being stored at least in part utilizing one or more counters implemented by the processor and memory of the first processing node;
to determine a resolved state for the given transaction as a particular one of the plurality of possible states for the given transaction based at least in part on the counters and responsive to the results of the repeated polling of the respective distinct selected subsets that each comprise fewer than all of the additional processing nodes, the resolved state representing an update of the initial state;
to store in the memory of the first processing node an indication of the resolved state in association with at least one value that reinforces the particular state as the resolved state within the first processing node, the value controlling a likelihood that the first processing node will subsequently modify the resolved state to a state other than the particular state;
to transmit the indication of the resolved state from the first processing node over the network to one or more other processing nodes under one or more specified conditions including at least one of (i) in response to a query received from a given one of the additional processing nodes in conjunction with polling performed by the given additional processing node as part of its participation in the consensus protocol, and (ii) in response to a query received from another processing node not currently participating in the consensus protocol; and to initiate at least one automated action based at least in part on the resolved state for the given transaction.

2. The apparatus of claim 1 wherein the consensus protocol is configured to provide Byzantine fault tolerance.

3. The apparatus of claim 1 wherein the at least one automated action comprises adding an entry characterizing the given transaction to a distributed ledger collectively maintained by the first and additional processing nodes.

4. The apparatus of claim 3 wherein the entry comprises a block and the distributed ledger comprises a blockchain.

5. The apparatus of claim 1 wherein participation of the first and additional processing nodes in the consensus protocol is controlled in accordance with at least one specified control mechanism requiring submission of one or more designated proofs by each of the first and additional processing nodes.

6. The apparatus of claim 5 wherein the designated proof comprises a proof other than a proof-of-work.

7. The apparatus of claim 1 wherein a given instance of the repeated polling comprises polling a random sample of the additional processing nodes.

8. The apparatus of claim 1 wherein a given instance of the repeated polling comprises polling a deterministic sample of the additional processing nodes.

9. The apparatus of claim 1 wherein the repeated polling is repeated for a plurality of iterations with each such iteration polling a different selected subset of the additional processing nodes.

10. The apparatus of claim 1 wherein the first processing node is further configured to utilize the results of the repeated polling to maintain a data structure that characterizes relationships between the given transaction and a plurality of other transactions, the data structure comprising at least one of a directed acyclic graph, a linked list and a hash-linked chain.

11. The apparatus of claim 1 wherein resolving the state for a given transaction responsive to results of the repeated polling comprises utilizing the results of the repeated polling to make a determination as to whether or not the given transaction should be accepted as a valid transaction.

12. The apparatus of claim 1 wherein the repeated polling is repeated for a plurality of iterations, a given one of the iterations comprising:

selecting a sample of the additional processing nodes;

sending queries to respective ones of the selected additional processing nodes;

responsive to receipt of at least a threshold number of responses to the queries, determining if at least a designated portion of the received responses indicate a particular state for the given transaction that differs from a current state for the given transaction in the first processing node; and responsive to the designated portion of the received responses indicating a particular state for the given transaction that differs from a current state for the given transaction in the first processing node, updating the current state for the given transaction in the first processing node to the particular state.

13. The apparatus of claim 12 wherein resolving the state for the given transaction responsive to results of the repeated polling comprises resolving the state for the given transaction to the current state at the completion of the plurality of iterations.

14. The apparatus of claim 12 wherein the first processing node is further configured to maintain a conviction strength counter that indicates a number of consecutive iterations of the repeated polling for which at least a designated portion of the received responses indicate the particular state for the given transaction.

15. The apparatus of claim 14 wherein resolving the state for the given transaction responsive to results of the repeated polling comprises resolving the state for the given transaction to the particular state responsive to the conviction strength counter exceeding a threshold.

16. The apparatus of claim 12 wherein the first processing node is further configured to maintain confidence counters for respective ones of the possible states for the given transaction, with each of the confidence counters indicating a total number of queries over multiple ones of the iterations that have yielded responses indicating the corresponding state.

17. The apparatus of claim 16 wherein resolving the state for the given transaction responsive to results of the repeated polling comprises resolving the state for the given transaction to one of the possible states responsive to the confidence counter for that possible state exceeding the confidence counter for at least one other one of the possible states.

18. The apparatus of claim 1 wherein the first processing node is further configured to maintain a directed acyclic graph of transactions that characterizes relationships between the given transaction and a plurality of other transactions with the transactions being partitioned into mutually exclusive conflict sets.

19. The apparatus of claim 18 wherein maintaining the directed acyclic graph comprises:

selecting a sample of the additional processing nodes;

sending queries to respective ones of the selected additional processing nodes; and updating the directed acyclic graph based at least in part on responses to the queries;

wherein updating the directed acyclic graph comprises one or more of:

inserting one or more additional transactions into the directed acyclic graph;

updating confidence values for respective ones of the transactions of the directed acyclic graph; and repartitioning the transactions of the directed acyclic graph into mutually exclusive conflict sets.

20. The apparatus of claim 19 wherein resolving the state for the given transaction responsive to results of the repeated polling comprises resolving the state responsive to the given transaction being the only transaction in its conflict set and the given transaction having a confidence value that exceeds a threshold.

21. The apparatus of claim 19 wherein resolving the state for the given transaction responsive to results of the repeated polling comprises resolving the state to one of the possible states responsive to a confidence counter for that possible state exceeding a confidence counter for at least one other one of the possible states.

22. A method comprising:

configuring a first processing node comprising a processor coupled to a memory to participate in a distributed consensus protocol with additional processing nodes, the first processing node and the additional processing nodes comprising respective processing devices configured to communicate with one another over at least one network;

in conjunction with its participation in the consensus protocol, the first processing node:

determining an initial state for a given transaction based at least in part on one or more of a plurality of possible states for the given transaction;

implementing repeated polling of respective distinct selected subsets of the additional processing nodes, each of the distinct selected subsets comprising fewer than all of the additional processing nodes, with at least portions of results of the repeated polling being stored at least in part utilizing one or more counters implemented by the processor and memory of the first processing node;

determining a resolved state for the given transaction as a particular one of the plurality of possible states for the given transaction based at least in part on the counters and responsive to the results of the repeated polling of the respective distinct selected subsets that each comprise fewer than all of the additional processing nodes, the resolved state representing an update of the initial state;

storing in the memory of the first processing node an indication of the resolved state in association with at least one value that reinforces the particular state as the resolved state within the first processing node, the value controlling a likelihood that the first processing node will subsequently modify the resolved state to a state other than the particular state;

transmitting the indication of the resolved state from the first processing node over the network to one or more other processing nodes under one or more specified conditions including at least one of (i) in response to a query received from a given one of the additional processing nodes in conjunction with polling performed by the given additional processing node as part of its participation in the consensus protocol, and (ii) in response to a query received from another processing node not currently participating in the consensus protocol; and initiating at least one automated action based at least in part on the resolved state for the given transaction.

23. The method of claim 22 wherein the repeated polling is repeated for a plurality of iterations, a given one of the iterations comprising:

selecting a sample of the additional processing nodes;

sending queries to respective ones of the selected additional processing nodes;

responsive to receipt of at least a threshold number of responses to the queries, determining if at least a designated portion of the received responses indicate a particular state for the given transaction that differs from a current state for the given transaction in the first processing node; and responsive to the designated portion of the received responses indicating a particular state for the given transaction that differs from a current state for the given transaction in the first processing node, updating the current state for the given transaction in the first processing node to the particular state.

24. The method of claim 22 further comprising the first processing node maintaining a directed acyclic graph of transactions that characterizes relationships between the given transaction and a plurality of other transactions with the transactions being partitioned into mutually exclusive conflict sets, wherein maintaining the directed acyclic graph comprises:

selecting a sample of the additional processing nodes;

sending queries to respective ones of the selected additional processing nodes; and updating the directed acyclic graph based at least in part on responses to the queries;

wherein updating the directed acyclic graph comprises one or more of:

inserting one or more additional transactions into the directed acyclic graph;

updating confidence values for respective ones of the transactions of the directed acyclic graph; and repartitioning the transactions of the directed acyclic graph into mutually exclusive conflict sets.

25. A computer program product comprising a non-transitory processor-readable storage medium having stored therein program code of one or more software programs, wherein the program code when executed by a first processing node, the first processing node comprising a processor coupled to a memory and being configured to participate in a consensus protocol with additional processing nodes, the first processing node and the additional processing nodes comprising respective processing devices configured to communicate with one another over at least one network, causes the first processing node in conjunction with its participation in the consensus protocol:

to determine an initial state for a given transaction based at least in part on one or more of a plurality of possible states for the given transaction;

to implement repeated polling of respective distinct selected subsets of the additional processing nodes, each of the distinct selected subsets comprising fewer than all of the additional processing nodes, with at least portions of results of the repeated polling being stored at least in part utilizing one or more counters implemented by the processor and memory of the first processing node;

to determine a resolved state for the given transaction as a particular one of the plurality of possible states for the given transaction based at least in part on the counters and responsive to the results of the repeated polling of the respective distinct selected subsets that each comprise fewer than all of the additional processing nodes, the resolved state representing an update of the initial state;

to store in the memory of the first processing node an indication of the resolved state in association with at least one value that reinforces the particular state as the resolved state within the first processing node, the value controlling a likelihood that the first processing node will subsequently modify the resolved state to a state other than the particular state;

to transmit the indication of the resolved state from the first processing node over the network to one or more other processing nodes under one or more specified conditions including at least one of (i) in response to a query received from a given one of the additional processing nodes in conjunction with polling performed by the given additional processing node as part of its participation in the consensus protocol, and (ii) in response to a query received from another processing node not currently participating in the consensus protocol; and to initiate at least one automated action based at least in part on the resolved state for the given transaction.

26. The computer program product of claim 25 wherein the repeated polling is repeated for a plurality of iterations, a given one of the iterations comprising:
- selecting a sample of the additional processing nodes;
- sending queries to respective ones of the selected additional processing nodes;
- responsive to receipt of at least a threshold number of responses to the queries, determining if at least a designated portion of the received responses indicate a particular state for the given transaction that differs from a current state for the given transaction in the first processing node; and
- responsive to the designated portion of the received responses indicating a particular state for the given transaction that differs from a current state for the given transaction in the first processing node, updating the current state for the given transaction in the first processing node to the particular state.

27. The computer program product of claim 25 further comprising the first processing node maintaining a directed acyclic graph of transactions that characterizes relationships between the given transaction and a plurality of other transactions with the transactions being partitioned into mutually exclusive conflict sets, wherein maintaining the directed acyclic graph comprises:
- selecting a sample of the additional processing nodes;
- sending queries to respective ones of the selected additional processing nodes; and
- updating the directed acyclic graph based at least in part on responses to the queries;

wherein updating the directed acyclic graph comprises one or more of:
- inserting one or more additional transactions into the directed acyclic graph;
- updating confidence values for respective ones of the transactions of the directed acyclic graph; and
- repartitioning the transactions of the directed acyclic graph into mutually exclusive conflict sets.

28. The apparatus of claim 1 wherein the at least one value that reinforces the particular state as the resolved state within the first processing node is determined at least in part utilizing the one or more counters.

29. The apparatus of claim 1 wherein the one or more counters comprise at least first and second counters, the first counter providing a count of a number of responses for a given polling iteration that each indicate the particular state, and the second counter providing a count of a number of consecutive polling iterations for each of which the first counter exceeds a first threshold.

30. The apparatus of claim 29 wherein the resolved state is determined based at least in part on the second counter exceeding a second threshold.

31. The apparatus of claim 1 wherein the automated action comprises initiating execution of at least one of a command and a script associated with maintenance of a distributed ledger by the first and additional processing nodes.

* * * * *